US012666399B2

(12) United States Patent
Zhou et al.

(10) Patent No.: US 12,666,399 B2
(45) Date of Patent: Jun. 23, 2026

(54) METHOD AND DEVICE FOR RESOURCE ALLOCATION

(71) Applicant: SAMSUNG ELECTRONICS CO., LTD., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 912 days.

(21) Appl. No.: 17/755,779

(22) PCT Filed: Nov. 5, 2020

(86) PCT No.: PCT/KR2020/015422
§ 371 (c)(1),
(2) Date: May 6, 2022

(87) PCT Pub. No.: WO2021/091267
PCT Pub. Date: May 14, 2021

(65) Prior Publication Data
US 2022/0394675 A1 Dec. 8, 2022

(30) Foreign Application Priority Data
Nov. 7, 2019 (CN) .......................... 201911084314.3

(51) Int. Cl.
*H04W 72/02* (2009.01)
*H04W 72/20* (2023.01)
*H04W 74/0808* (2024.01)

(52) U.S. Cl.
CPC ........... *H04W 72/02* (2013.01); *H04W 72/20* (2023.01); *H04W 74/0808* (2013.01)

(58) Field of Classification Search
CPC .. H04W 72/02; H04W 72/20; H04W 74/0808
See application file for complete search history.

(56) References Cited

U.S. PATENT DOCUMENTS

2016/0066337 A1    3/2016  Sartori et al.
2016/0073408 A1    3/2016  Sartori et al.
            (Continued)

FOREIGN PATENT DOCUMENTS

CN        107484254 A      12/2017
CN        107889161 A      4/2018
            (Continued)

OTHER PUBLICATIONS

Summons to attend oral proceedings pursuant to Rule 115(1) EPC issued Mar. 14, 2024, in connection with European Patent Application No. 20884145.2, 8 pages.
            (Continued)

*Primary Examiner* — Rhonda L Murphy

(57) ABSTRACT

The present disclosure relates to a pre-5G or 5G communication system to be provided for supporting higher data rates Beyond 4G communication system such as LTE. Embodiments of the present application provide a method and a device for resource allocation. The method includes: initiating initial resource selection for temporarily selecting resources for data to be transmitted; performing a first resource reselection after initial resource selection is initiated and before UE announces resources, and when a first SCI transmitted by other UE is received and a predefined condition for triggering resource reselection is met, wherein a resource reserved by other UE indicated in first SCI is at least one of resources temporarily selected by UE; transmitting PSCCH or PSSCH on first resource according to a result of first resource reselection, and announcing other resources except first resource through transmitted SCI.

20 Claims, 9 Drawing Sheets

(56)                References Cited

U.S. PATENT DOCUMENTS

| | | | |
|---|---|---|---|
| 2018/0049220 A1 | 2/2018 | Patil et al. |
| 2019/0110177 A1 | 4/2019 | Lee et al. |
| 2019/0246249 A1 | 8/2019 | Lee et al. |
| 2019/0289615 A1 | 9/2019 | Lee et al. |
| 2019/0327753 A1 | 10/2019 | Lee et al. |
| 2021/0045088 A1 | 2/2021 | Cai et al. |
| 2022/0201528 A1 | 6/2022 | Shin et al. |

FOREIGN PATENT DOCUMENTS

| | | | | |
|---|---|---|---|---|
| CN | 108024230 A | 5/2018 | | |
| CN | 108400843 A | 8/2018 | | |
| CN | 108632781 A | 10/2018 | | |
| CN | 109121214 A | 1/2019 | | |
| CN | 109478991 A | 3/2019 | | |
| CN | 109565791 A | 4/2019 | | |
| CN | 110167072 A | 8/2019 | | |
| CN | 110351687 A | 10/2019 | | |
| WO | WO-2020033088 A1 * | 2/2020 | ........... | H04W 72/02 |
| WO | 2020/222532 A1 | 11/2020 | | |

OTHER PUBLICATIONS

Examination Report issued Mar. 12, 2024, in connection with Indian Patent Application No. 202217027140, 7 pages.
Supplementary European Search Report dated Mar. 14, 2023, in connection with European Patent Application No. 20884145.2, 11 pages.
First Office Action issued May 8, 2024, in connection with Chinese Patent Application No. 201911084314.3, 14 pages.
Liu et al., "Energy Efficiency Resource Reuse for Device-to-Device Communication", Journal of Southwest Jiaotong University, vol. 51, No. 4,Aug. 2016, 7 pages.
Molina-Masegosa et al, "Configuration of the C-V2X Mode 4 Sidelink PC5 Interface for Vehicular Communication", 2018 14th International Conference on Mobile Ad-HocAnd Sensor Networks (MSN), Apr. 2019, 6 pages.

Intel Corporation, "Remaining sensing and resource selection issues for sidelink V2V communication", R1-1611921, 3GPP TSG RAN WG1 Meeting #87, Reno, USA, Nov. 14-18, 2016, 6 pages.
Spreadtrum Communications, "Discussion on NR sidelink Mode 2 resource allocation", R1-1910007, 3GPP TSG RAN WG1 #98bis, Chongqing, China, Oct. 14-20, 2019, 5 pages.
Communication pursuant to Article 94(3) EPC dated Sep. 11, 2023, in connection with European Patent Application No. 20884145.2, 6 pages.
VIVO: "Discussion on mode 2 resource allocation mechanism", R1-1911420, 3GPP TSG RAN WG1 #98bis meeting, Chongqing, China, Oct. 14-20, 2019, 15 pages.
International Search Report and Written Opinion of the International Searching Authority in connection with International Application No. PCT/KR2020/015422 issued Feb. 10, 2021, 8 pages.
Xiaomi Communications, "On Mode 2 resource allocation of V2x communications" R1-1911289, 3GPP TSG RAN WG1 #98bis, Chongqing, China, Oct. 14-20, 2019, 3 pages.
CATT, "Discussion on resource allocation mechanism for sidelink Mode 2 in NR V2X" R1-1910329, 3GPP TSG RAN WG1 Meeting #98bis, Chongqing, China, Oct. 14 - 20, 2019, 13 pages.
OPPO, "Discussions on resource reservation, sensing and selection in Mode 2" R1-1910379, 3GPP TSG-RAN WG1 Meeting #98bis, Chongqing, China, Oct. 14-20, 2019, 11 pages.
Intel Corporation, "Resource Allocation Mode-2 for NR V2X Sidelink Communication" R1-1910650, 3GPP TSG RAN WG1 Meeting #98bis, Chongqing, China, Oct. 14-20, 2019, 28 pages.
Notification of Granting of Patent Right to Invention issued Nov. 23, 2024, in connection with Chinese Patent Application No. 201911084314. 3, 7 pages.
Qualcomm Incorporated, "Sidelink Resource Allocation Mechanism for NR V2X," R1-1911106, 3GPP TSG-RAN WG1 #98bis, Chongqing, China, Oct. 14-20, 2019, 10 pages.
Office Action dated Dec. 12, 2025, in connection with Korean Application No. 10-2022-7012207, 22 pages.
Fraunhofer IIS, et al., "QoS Management for NR sidelink", 3GPP TSG RAN WG1 #98, R1-1908746, Aug. 2019, 4 pages.
Intel Corporation, "Summary#1 for AI 7.2.4.2.2 Mode-2 Resource Allocation", 3GPP TSG RAN WG1 Meeting #98bis, R1-1911347, Oct. 2019, 33 pages.
Hearing Notice dated Feb. 10, 2026, in connection with Indian Application No. 202217027140, 2 pages.

* cited by examiner

Perform resource preliminary
selection at time point n (n)

Sensing window

Resource
selection window

Time

-T0                    0  T1              T2              PDB

Perform resource
preliminary selection
at time point n

Receive the SCI transmitted by
other UE at time point k, which
indicates that r1 is reserved (n)          (k)   (t0)   (t1)   (t2)

Sensing window

SCI r0 r1 r2

Resource selection window

Time

-T0                    0  T1                        T2    PDB

METHOD AND DEVICE FOR RESOURCE ALLOCATION

CROSS-REFERENCE TO RELATED APPLICATIONS

This application is a 371 of International Application No. PCT/KR2020/015422, filed 5 Nov. 2020, which claims priority to Chinese Patent Application No. 201911084314.3, filed 7 Nov. 2019, the disclosures of which are herein incorporated by reference in their entirety.

BACKGROUND

1. Field

This application relates to the field of wireless communication technologies, and in particular, to a method and device for resource allocation.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 3GPP Long Term Evolution (LTE) standard, the direct communication link between a user equipment (UE) and a UE is called a Sidelink (SL). Similar to the Uplink (UL) and the Downlink (DL), there are also control channels and data channels on the sidelink, where the former is called the Physical Sidelink Control Channel (PSCCH) and the latter is called the Physical Sidelink Shared Channel (PSSCH). The PSCCH is used to indicate information such as the time-frequency domain resource location, the modulation and coding mode of the PSSCH transmission, and the PSSCH is used to carry data.

In the 3GPP LTE standard, two types of sidelink communication mechanisms are defined, that is Device to Device (D2D) direct communication and sidelink-based Vehicle to Vehicle/Perdestrian/Infrastructure/Network (hereinafter referred to as V2X). The latter is superior to the former in terms of data rate, delay and reliability, so it has become the most representative sidelink communication technology in the current 3GPP LTE standard.

From the perspective of the resource allocation mechanism, the existing LTE V2X technology includes two modes, that is, a resource allocation mode (Mode 3) based on base station scheduling, also known as a centralized resource allocation mode, and a resource allocation mode that the UE autonomously selects (Mode 4), also known as a distributed resource allocation mode. For Mode 3, the UE determines the sidelink resource allocated by the base station based on the downlink control channel of the receiving base station, and the interference between different UEs can be avoided through a reasonable base station scheduling strategy. For Mode 4, the base station does not participate in specific resource allocation, and the UE autonomously determines the sidelink resource based on the detection for the sidelink channel. The reasonable design of the UE autonomous resource allocation algorithm reduces the interference level between different UEs.

In the transmission mode 4 (Mode-4) of LTE V2X, the LTE V2X UE selects resources based on an autonomous method. According to the sensing information in one sensing window, the UE may select K resources that it can occupy and reserve continuously for C cycles. One method for sensing resources is to obtain the PSSCH scheduled by the above PSCCH based on decoding the PSCCH of other UE, so that the received power of the corresponding UE can be measured, such as the Physical Sidelink Shared Channel-Reference Signal Receive Power (RSRP), so as to determine resource occupation and/or reservation based on the above received power and the reservation interval in the PSCCH. Another method for sensing resources is to determine resource occupation and/or reservation based on the received energy (for example, Sidelink-Receive Signal Strength Indicator (S-RRSI)). For a resource on the subframe x in the selection window, the above-mentioned received energy refers to an average value of the received energy of the resources of a same subchannel on the subframe $x-P_{rsvp} \cdot j$ in the sensing window, where $P_{rsvp}$ is a reserved interval, for example, j is an arbitrary integer. By combining the above two sensing methods, the device can avoid occupying the same resources for transmission as other devices as much as possible.

FIG. 1 illustrates an example flowchart of a UE autonomous resource allocation method in LTE V2X. Assume that resource selection is performed on subframe n, and the current reserved interval of the device's reserved resources is $P_A$. The device can select resources in the selection window $[n+T_1, n+T_2]$ and reserve consecutive C cycles at intervals. $P_A$ $T_1$ and $T_2$ depends on the implementation of the UE, for example, $T_1 \leq 4$, $20 \leq T_2 \leq 100$ $T_1$ depends on the delay from UE selecting resources to the time when it can start transmitting Scheduling Assignment (SA) signaling and data, $T_2$ mainly depends on the delay characteristics that the current service can tolerate. In FIG. 1, firstly all resources in the selection window are set to be in the set $S_A$ (step 101). Next, based on the correctly decoded SA, assuming that the SA indicates that resources continue to be reserved after subframe n, the received power of the data channel scheduled by the SA is measured. When the received power exceeds the corresponding threshold Th1, some candidate resources of $S_A$ are excluded (step 102). Specifically, when the received power exceeds the corresponding threshold Th1, according to the SA, the resource Y reserved after the subframe n is unavailable. The above threshold Th1 may be jointly determined according to the priority of the device that performs resource selection and the priority indicated by the correctly decoded SA. $R_{x,y}$ represents a single subframe resource in the selection window $[n+T_1, n+T_2]$, where $R_{x,y}$ is located in the subframe y and contains one or more consecutive subchannel starting from the subchannel x. Then, when the PRB of $R_{x,y+j\cdot P_A}$ overlaps with the PRB of the resource Y, $R_{x,y}$ is unavailable for device A, that is, $R_{x,y}$ is excluded from the set $S_A$, and j=O, 1, . . . C−1, and C is the number of cycles that device A currently needs to reserve resources by the cycle $P_A$. Next, it is determined whether the remaining resources of $S_A$ have reached the ratio R of the total resources, for example, 20% (step 103). If the ratio is less than R, the threshold Th1 is increased by 3 dB (step 104) and process is restarted from step 101; otherwise, step 105 is continued. In step 105, the received energy of the above-mentioned remaining resources of $S_A$ is estimated, and the resource with the least received energy is moved to the set $S_B$, until the ratio of the resources of $S_B$ is R. For a resource containing multiple subchannels, the received energy of this resource is the average of the received energy on each subchannel contained in the resource. Next, selecting a resource for data transmission from the resources of $S_B$ (step 106) and performing data transmission (step 107). Here, when data is transmitted twice, the UE first selects a resource for data transmission in $S_B$, and then, after meeting the delay requirements and within the range indicated by the SA, if there are available resources, the UE selects another resource for data transmission.

In the NR V2X system, two resource allocation methods are supported. The first method is a resource allocation method scheduled by the base station, that is, Mode 1 (corresponding to Mode 3 in the LTE V2X system), also known as centralized resource allocation, the sidelink resources of V2X UE are allocated by the base station through downlink control signaling (DCI) the second method is a UE autonomous resource allocation method, namely Mode 2 (corresponding to Mode 4 in the LTE V2X system), also known as distributed resource allocation, the sidelink resources of V2X UE are autonomously allocated by the UE itself according to a prescribed resource selection method.

Compared with the LTE V2X system, the NR V2X system can support more types of business models. For example, the data of the business model of the UE may arrive non-periodically. In Mode 2, the UE may only use the self-selected resources once and may not reserve periodically the resources according to a certain reservation interval, so the above-mentioned UE autonomous resource allocation method in FIG. 1 may need to be improved. How to design the UE autonomous resource allocation method in Mode 2 of the NR V2X system is a problem which is needed to be solved urgently.

SUMMARY

In view of the shortcomings of the existing methods, this application proposes a method and device for resource allocation to solve the problem of how to implement UE autonomous resource allocation method of the NR V2X system in Mode 2.

In a first aspect, a method for resource allocation is provided, applied to user equipment UE, comprising:

initiating initial resource selection for temporarily selecting resources for data to be transmitted;

performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; and transmitting Physical Sidelink Control Channel (PSCCH) or Physical Sidelink Shared Channel (PSSCH) on first resource according to a result of the first resource reselection, and announcing other resources except the first resource through the transmitted SCI.

Optionally, performing a second resource reselection after the UE announces resources and before transmitting data on the announced resource, and when a second SCI transmitted by other UE is received and the predefined condition for triggering resource reselection is met, wherein a resource reserved by the other UE indicated in the second SCI is at least one of the resources that the UE has announced.

Optionally, the condition for triggering the first resource reselection comprises at least one of the following:

the UE triggers the first resource reselection when Reference Signal Received Power (RSRP), associated with the first SCI, measured by the UE is higher than a preconfigured threshold;

the UE triggers the first resource reselection when a priority of the data to be transmitted of the UE is lower than or equal to a priority of the data indicated in the first SCI;

the UE triggers the first resource reselection when the priority of the data to be transmitted of the UE is lower than the priority of the data indicated in the first SCI;

the UE triggers the first resource reselection when the priority of the data to be transmitted of the UE is lower than the priority of the data indicated in the first SCI, and a difference between the priority of the data to be transmitted of the UE and the priority of the data indicated in the first SCI is greater than or equal to a predefined or preconfigured threshold;

the UE triggers the first resource reselection when a resource on which the UE is to collide with the other UE is any one of the resources temporarily selected by the UE;

the UE triggers the first resource reselection when the resource on which the UE is to collide with the other UE is all resources temporarily selected by the UE;

the UE triggers the first resource reselection when the number of resources on which the UE is to collide with the other UE is greater than a predefined or preconfigured threshold;

the UE triggers the first resource reselection when the number of resources temporarily selected by the UE other than the resource on which the UE is to collide with the other UE is less than a predefined or preconfigured threshold;

the UE triggers the first resource reselection when the number of resources temporarily selected by the UE other than the resource on which the UE is to collide with the other UE is less than the number of transport blocks to be transmitted, or is insufficient to support one transmission process of data to be transmitted; and the UE triggers the first resource reselection when the resource on which the UE is to collide with the other UE is the first resource temporarily selected by the UE.

Optionally, the RSRP threshold used to trigger the first resource reselection is the same as the RSRP threshold used for resource exclusion in the initial resource selection process.

Optionally, the manner for determining the RSRP threshold used to trigger the first resource reselection comprises any one of the following:

using an initial value of the RSRP threshold used for resource exclusion in the initial resource selection process as the RSRP threshold used to trigger the first resource reselection; or using an adjusted value of the RSRP threshold used for resource exclusion in the initial resource selection process as the RSRP threshold used to trigger the first resource reselection.

Optionally, the RSRP threshold for triggering the first resource reselection and the RSRP threshold for resource exclusion in the initial resource selection process are configured separately.

Optionally, the RSRP threshold for triggering the first resource reselection is configured according to the priority of the data to be transmitted of the UE and the priority of the data indicated in the first SCI.

Optionally, time relationship between the UE triggering the first resource reselection and performing the first resource reselection comprises at least one of the following:

the UE performs the first resource reselection immediately after triggering the first resource reselection, and the time point at which the first resource reselection is triggered is the same time point as the time point at which the first resource reselection is performed; and the UE does not perform the first resource reselection immediately after triggering the first resource reselection, and until a specific time point the UE performs the first resource reselection, the time point at which the first resource reselection is triggered is different from the time point at which the first resource reselection is performed.

Optionally, the UE performing the first resource reselection immediately after triggering the first resource reselection comprises:

the UE successfully receives the first SCI at a first time point, and when the condition for triggering resource reselection is met, the UE performs the first resource reselection at the first time point; or the UE successfully receives the first SCI at a first time point, and the UE determines whether the first resource reselection is triggered at a predefined time point t0-Tp before the time point t0 at which the first resource temporarily selected by the UE is located, and when the condition for triggering resource reselection is met, the UE performs the first resource reselection at the time point t0-Tp, wherein the Tp is a predefined or preconfigured value, and the t0-Tp indicates a time point before t0 by an interval of Tp.

Optionally, the UE does not perform the first resource reselection immediately after triggering the first resource reselection, and until a specific time point, the UE performs the first resource reselection, comprising:

the UE successfully receives the first SCI at a first time point, and when the condition for triggering resource reselection is met, the UE triggers the first resource reselection at the first time point, and after triggering the first resource reselection, until time point t0-Tp before the time point t0 at which the first resource temporarily selected by the UE is located, the UE performs the first resource reselection, where Tp is a predefined or preconfigured value, the t0-Tp indicates a time point before t0 by an interval of Tp; or the UE successfully receives the first SCI at the first time point, and when the condition for triggering resource reselection is met, the UE triggers the first resource reselection at the first time point, and after triggering the first resource reselection, until the time point before a first available resource by a predefined interval Tp, the UE performs the first resource reselection, where Tp is a predefined or preconfigured value.

Optionally, the Tp comprises at least a preparation time for transmitting a PSCCH/PSSCH, and/or a processing time for performing the first resource reselection process.

Optionally, the number of times that the UE performs the first resource reselection should not exceed a predefined or preconfigured maximum value.

Optionally, when the number of times that the UE performs the first resource reselection exceeds the maximum value and a collision will occur between the resources selected by the UE and resources announced by other UE, and the conditions for triggering the resource reselection are met, the transmit power of the PSCCH and/or the PSSCH transmitted by the UE on the resource to be collided is adjusted.

Optionally, an adjustment amount of the transmit power of the PSCCH and/or the transmit power of the PSSCH is related to at least one of the following:

the RSRP of the other UE measured by the UE; and the priority of the data to be transmitted of the UE;

the priority of the data of the other UE.

Optionally, adjusting the transmit power of the PSCCH and/or the transmit power of the PSSCH comprises at least one of the following:

when the priority of the data to be transmitted of the UE is higher than the priority of the data of the other UE, and/or the RSRP of the other UE measured by the UE is lower than a preconfigured threshold, the transmit power of the PSCCH and/or the transmit power of the PSSCH transmitted by the UE on the resource to be collided is adjusted to be higher;

when the priority of the data to be transmitted of the UE is lower than the priority of the data of the other UE, and/or the RSRP of the other UE measured by the UE is higher than the preconfigured threshold, the transmit power of the PSCCH and/or the transmit power of the PSSCH transmitted by the UE on the resource to be collided is adjusted to be lower.

Optionally, the manner of defining a sensing window for the first resource reselection comprises at least one of the following:

the sensing window for the first resource reselection is a translation of a sensing window for a resource preliminary selection, and the resource preliminary selection is the initial resource selection;

the sensing window for the first resource reselection includes the sensing window for the resource preliminary selection, and the time after a time point n and before a time point m, where the time point n is a time point at which the resource preliminary selection is performed, and the time point m is a time point at which the first resource reselection is performed; and the sensing window for the resource reselection includes the time after the time point n and before the time point m.

Optionally, a manner of defining a resource selection window for the first resource reselection comprises at least one of the following:

using a same criteria to determine the resource selection window for the first resource reselection and the resource selection window for the resource preliminary selection, and there is no correlation between the actual lengths of the two resource selection windows, wherein the resource preliminary selection is the initial resource selection;

the resource selection window for the first resource reselection is a translation of the resource selection window for resource preliminary selection;

the resource selection window for the first resource reselection is the remaining available time in the resource selection window for the resource preliminary selection; and the resource selection window for the first resource reselection includes all of available time until Packet Delay Budget (PDB).

Optionally, an enable or disable status of the first resource reselection function is configured by at least one of the following:

configuring the enable or disable status of the first resource reselection function for each resource pool;

configuring the enable or disable status of the first resource reselection function for each UE;

configuring the enable or disable status of the first resource reselection function for a Channel Busy Ratio (CBR) on a resource pool; and configuring the enable or disable status of the first resource reselection function for the priority of the data.

Optionally, configuring the enable or disable status of the first resource reselection function before resource announcement for a CBR on a resource pool, comprising:

for the same resource pool, when the CBR is greater than a first threshold, the first resource reselection function is set to be enabled; when the CBR is less than a second threshold, the first resource reselection function is set to be disabled.

Optionally, configuring the enable or disable status of the first resource reselection function before the resource announcement for each priority or a range of priority of data, comprising:

for the same UE, when the priority of data to be transmitted is greater than a first priority, the first resource reselection function is set to be enabled; when the priority of data to be transmitted is lower than a second priority, the first resource reselection function is set to be disabled.

Optionally, the condition for triggering the second resource reselection comprises at least one of the following:

the UE triggers the second resource reselection when the RSRP, associated with the second SCI, measured by the UE is higher than a preconfigured threshold;

the UE triggers the second resource reselection when the interval between the time when the UE successfully receives the second SCI and the PDB of the data to be transmitted is greater than a predefined or preconfigured threshold; and the UE triggers the second resource reselection when the resource on which the UE will collide with other UE is used for the first transmission of a transport block of the UE.

Optionally, a manner of determining a time point at which performing second resource reselection includes any of the following:

the UE successfully receives the second SCI at the second time point, and when the condition for triggering the resource reselection is met, the UE performs the second resource reselection at the second time point; and the UE successfully receives the second SCI at the second time point, and when the condition for triggering the resource reselection is met, the UE performs the second resource reselection at a time point by predefined interval before the time point of the resource to be collided.

In a second aspect, a UE is provided, including:

a first processing module configured to initiate initial resource selection for temporarily selecting resources for data to be transmitted;

a second processing module configured to perform a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; and a third processing module configured to transmitting PSCCH or PSSCH on the first resource according to a result of the first resource reselection, and announcing other resources except the first resource through the transmitted SCI.

In a third aspect, the present application provides a UE, including: a processor, a memory, and a bus;

the bus is configured to connect the processor and the memory;

the memory is configured to store an operation instruction;

the processor is configured to execute the method for resource allocation in the first aspect of the present application by invoking the operation instruction.

The technical solutions provided in the embodiments of the present application have at least the following beneficial effects:

initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

Additional aspects and advantages of the present application will be given in the following description, which will become apparent from the following description or be learned through the practice of the present application.

BRIEF DESCRIPTION OF THE DRAWINGS

In order to explain the technical solutions in the embodiments of the present application more clearly, the drawings used in the description of the embodiments of the present application will be briefly introduced below.

DETAILED DESCRIPTION

Figure 1:
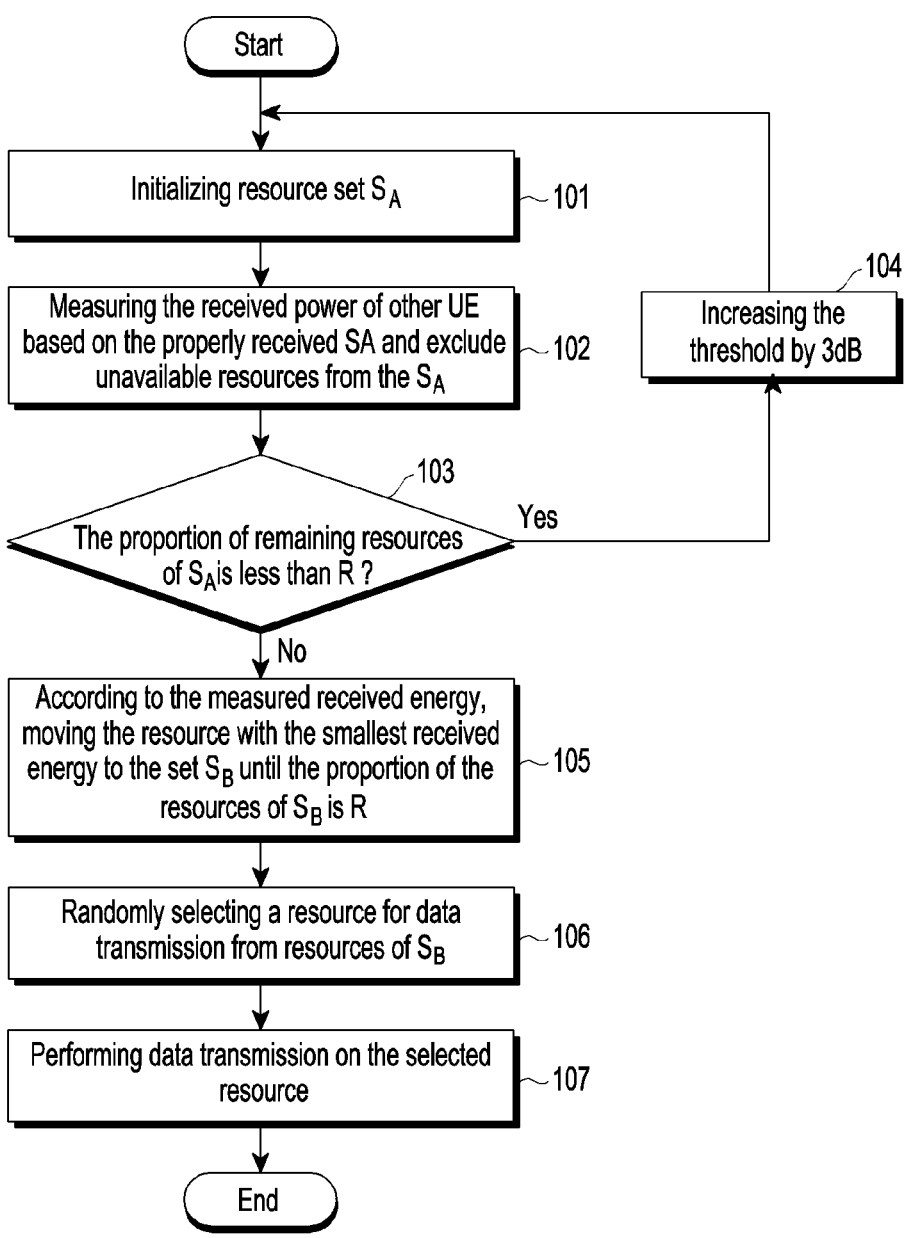
FIG. 1 is a schematic flowchart of a UE autonomous resource allocation method of LTE V2X.

Embodiments of the present application will be described below in detail. The examples of these embodiments have been illustrated in the drawings throughout which same or similar reference numerals refer to same or similar elements or elements having same or similar functions. The embodiments described with reference to the drawings are illustrative, merely used for explaining the present application and should not be regarded as any limitations thereto.

It should be understood by a person of ordinary skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

To make the objectives, technical solutions and advantages of the embodiments of the present applicant clearer, the implementations of the present application will be further described below in detail with reference to the accompanying drawings.

Embodiment One

Figure 2:
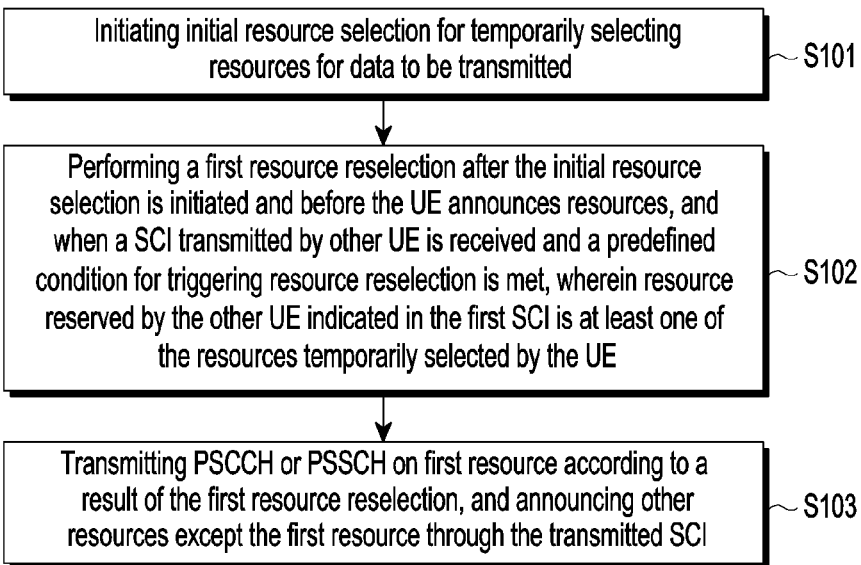
FIG. 2 is a schematic flowchart of a resource allocation method according to an embodiment of the present application.

An embodiment of the present application provides a method for resource allocation, applied to a UE. A schematic flowchart of the method is shown in FIG. 2, and the method includes:

Step S101, initiating initial resource selection for temporarily selecting resources for data to be transmitted.

Step S102, performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE.

Step S103, transmitting Physical Sidelink Control Channel (PSCCH) or Physical Sidelink Shared Channel (PSSCH) on a first resource according to a result of the first resource reselection, and announcing other resources except the first resource through the transmitted SCI.

In the embodiment of the present application, initiating initial resource selection for temporarily selecting resources for data to be transmitted; performing a first resource reselection after the initial resource selection is initiated and before the UE announces resources, and when a first SCI transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

Optionally, performing a second resource reselection after the UE announces resources and before transmitting data on the announced resource, and when a second SCI transmitted by other UE is received and the predefined condition for triggering resource reselection is met, wherein the resource reserved by the other UE indicated in the second SCI is at least one of the resources announced by the UE.

Optionally, the conditions for triggering the first resource reselection comprise at least one of the following:

the UE triggers the first resource reselection when the RSRP, associated with the first SCI, measured by the UE is higher than a preconfigured threshold;

the UE triggers the first resource reselection when priority of the data to be transmitted of the UE is lower than or equal to the priority of the data indicated in the first SCI;

the UE triggers the first resource reselection when the priority of the data to be transmitted of the UE is lower than the priority of the data indicated in the first SCI;

the UE triggers the first resource reselection when the priority of the data to be transmitted of the UE is lower than the priority of the data indicated in the first SCI, and a difference between the priority of the data to be transmitted of the UE and the priority of the data indicated in the first SCI is greater than or equal to a predefined or preconfigured threshold;

the UE triggers the first resource reselection when the resource on which the UE is to collide with the other UE is any one of the resources temporarily selected by the UE;

the UE triggers the first resource reselection when the resources on which the UE is to collide with the other UE are all resources temporarily selected by the UE;

the UE triggers the first resource reselection when the number of resources on which the UE is to collide with the other UE is greater than the predefined or preconfigured threshold;

the UE triggers the first resource reselection when the number of resources temporarily selected by the UE other than resource on which the UE is to collide with the other UE is less than the predefined or preconfigured threshold;

the UE triggers the first resource reselection when the number of resources temporarily selected by the UE other than the resource on which the UE is to collide with the other UE is less than the number of transport blocks to be transmitted, or is insufficient to support one transmission of data to be transmitted; and the UE triggers the first resource reselection when the resource on which the UE is to collide with the other UE is the first resource temporarily selected by the UE.

Optionally, the RSRP threshold used to trigger the first resource reselection is the same as the RSRP threshold used for resource exclusion in the initial resource selection process.

Optionally, the manner for determining the RSRP threshold used to trigger the first resource reselection comprises any one of the following:

using an initial value of the RSRP threshold used for resource exclusion in the initial resource selection process as the RSRP threshold used to trigger the first resource reselection; or using an adjusted value of the RSRP threshold used for resource exclusion in the initial resource selection process as the RSRP threshold used to trigger the first resource reselection.

Optionally, the RSRP threshold for triggering the first resource reselection and the RSRP threshold for resource exclusion in the initial resource selection process are configured separately.

Optionally, the RSRP threshold for triggering the first resource reselection is configured according to the priority of the data to be transmitted of the UE and the priority of the data indicated in the first SCI.

Optionally, the time relationship between the UE triggering the first resource reselection and performing the first resource reselection comprises at least one of the following:

the UE performs the first resource reselection immediately after triggering the first resource reselection, where the time point at which the first resource reselection is triggered is the same as the time point at which the first resource reselection is performed;

the UE does not perform the first resource reselection immediately after triggering the first resource reselection, and until a specific time point, the UE performs the first resource reselection, where the time point at which the first resource reselection is triggered is different from the time point at which the first resource reselection is performed.

Optionally, the UE performing the first resource reselection immediately after triggering the first resource reselection comprises:

the UE successfully receives the first SCI at a first time point, and when the condition for triggering resource reselection is met, the UE performs the first resource reselection at the first time point; or the UE successfully receives the first SCI at a first time point, and the UE determines whether the first resource reselection is triggered at a predefined time point t0-Tp before the time point t0 at which the first resource temporarily selected by the UE is located, when the condition for triggering resource reselection is met, the UE performs the first resource reselection at the time point t0-Tp, wherein the Tp is a predefined or preconfigured value, and the t0-Tp indicates a time point before t0 by an interval of Tp.

Optionally, the UE does not perform the first resource reselection immediately after triggering the first resource reselection, and until a specific time point, the UE performs the first resource reselection, comprising:

the UE successfully receives the first SCI at a first time point, and when the condition for triggering resource reselection is met, the UE triggers the first resource reselection at the first time point, and after triggering the first resource reselection, until the time point t0-Tp before the time point t0 at which the first resource temporarily selected by the UE is located, the UE performs the first resource reselection, where Tp is a predefined or preconfigured value, the t0-Tp indicates a time point before t0 by an interval of Tp; or the UE successfully receives the first SCI at the first time point, and when the condition for triggering resource reselection is met, the UE triggers the first resource reselection at the first time point, and after triggering the first resource reselection, until the time point before that of the first available resource by a predefined interval Tp, the UE performs the first resource reselection, where Tp is a predefined or preconfigured value.

Optionally, the Tp comprises at least a preparation time for transmitting a PSCCH/PSSCH, and/or a processing time for performing the first resource reselection process.

Optionally, the number of times that the UE performs the first resource reselection should not exceed a predefined or preconfigured maximum value.

Optionally, when the number of times that the UE performs the first resource reselection exceeds the maximum value and a collision will occur between the resources selected by the UE and resources announced by other UEs, and the conditions for triggering the resource reselection are met, the transmit power of the PSCCH and/or the PSSCH transmitted by the UE on the resource to be collided is adjusted.

Optionally, the adjustment amount of the transmit power of the PSCCH and/or the transmit power of the PSSCH is related to at least one of the following:

the RSRP of the other UE measured by the UE;

the priority of the data to be transmitted of the UE;

the priority of the data of the other UE.

Optionally, adjusting the transmit power of the PSCCH and/or the transmit power of the PSSCH comprises at least one of the following:

when the priority of the data to be transmitted of the UE is higher than the priority of the data of the other UE, and/or the RSRP of the other UE measured by the UE is lower than a preconfigured threshold, the transmit power of the PSCCH and/or the transmit power of the PSSCH transmitted by the UE on the resource to be collided is adjusted to be higher;

when the priority of the data to be transmitted of the UE is lower than the priority of the data of the other UE, and/or the RSRP of the other UE measured by the UE is higher than the preconfigured threshold, the transmit power of the PSCCH and/or the transmit power of the PSSCH transmitted by the UE on the resource to be collided is adjusted to be lower.

Optionally, the manner of defining a sensing window for the first resource reselection comprises at least one of the following:

the sensing window for the first resource reselection is a translation of a sensing window for the resource preliminary selection, and the resource preliminary selection is the initial resource selection;

the sensing window for the first resource reselection includes the sensing window for the resource preliminary selection, the time after a time point n and before a time point m, where the time point n is a time point at which the resource preliminary selection is performed, and the time point m is a time point at which the first resource reselection is performed;

the sensing window for the resource reselection includes the time after the time point n and before the time point m.

Optionally, a manner of defining a resource selection window for the first resource reselection comprises at least one of the following:

using a same criteria to determine the resource selection window for the first resource reselection and the resource selection window for a resource preliminary selection, and there is no correlation between the actual lengths of the two resource selection windows, wherein the resource preliminary selection is the initial resource selection;

the resource selection window for the first resource reselection is a translation of the resource selection window for resource preliminary selection;

the resource selection window for the first resource reselection is the remaining available time in the resource selection window for the resource preliminary selection; and the resource selection window for the first resource reselection includes all of available time until Packet Delay Budget (PDB).

Optionally, an enable or disable status of the first resource reselection function is configured by at least one of the following:

configuring the enable or disable status of the first resource reselection function for each resource pool;

configuring the enable or disable status of the first resource reselection function for each UE;

configuring the enable or disable status of the first resource reselection function for a Channel Busy Ratio (CBR) on a resource pool; and configuring the enable or disable status of the first resource reselection function for the priority of the data.

Optionally, configuring the enable or disable status of the first resource reselection function before resource announcement for a CBR on a resource pool, comprising:

for the same resource pool, when the CBR is greater than a first threshold, the first resource reselection function is set to be enabled; when the CBR is less than a second threshold, the first resource reselection function is set to be disabled.

Optionally, configuring the enable or disable status of the first resource reselection function before the resource announcement for each priority or a range of priority of data, comprising:

for the same UE, when the priority of data to be transmitted is greater than a first priority, the first resource reselection function is set to be enabled; when the priority of data to be transmitted is lower than a second priority, the first resource reselection function is set to be disabled.

Optionally, the condition for triggering the second resource reselection comprises at least one of the following:

the UE triggers the second resource reselection when Reference Signal Received Power (RSRP), associated with the second SCI, measured by the UE is higher than a preconfigured threshold;

the UE triggers the second resource reselection when the interval between the time when the UE successfully receives the second SCI and the PDB of the data to be transmitted is greater than a predefined or preconfigured threshold;

the UE triggers the second resource reselection when the resource on which the UE will collide with other UE is used for the first transmission of a transport block of the UE.

Optionally, a manner of determining a time point at which performing second resource reselection includes any of the following:

the UE successfully receives the second SCI at the second time point, and when the condition for triggering the resource reselection is met, the UE performs the second resource reselection at the second time point;

the UE successfully receives the second SCI at the second time point, and when the condition for triggering the resource reselection is met, the UE performs the second resource reselection at a time point by a predefined interval before the time point at which the resource to be collided is located.

The technical solutions provided in the embodiments of the present application have at least the following beneficial effects:

the UE autonomous resource allocation of the NR V2X system in Mode 2 is achieved.

The above embodiments of the present application are comprehensively and thoroughly introduced by the following embodiments:

In one embodiment, the UE is configured with an autonomous resource allocation mode (Mode 2). When data arrives, an initial resource selection is initiated for the data to be transmitted; before the resource is announced (that is the resource is reserved through SCI indication), temporarily selected resource may be reserved by other UE through the SCI indication in advance, then a resource reselection needs to be initiated for resources that are temporarily selected but reserved by other UE; after the resource is announced (that is the resource is reserved through SCI indication), resource that has been reserved may still be reserved by other UE through SCI indication, that is, pre-empted by other UE, then resource reselection needs to be initiated for the resource that has been reserved but is pre-empted by other UE.

Specifically, in Mode 2, the overall procedure for the UE to allocate resources for data to be transmitted includes one of the following a first step, a second step and a third step:

Step 1: The UE initiates an initial resource selection for the data to be transmitted at a time point.

The UE may temporarily select one or N (N>1) resources for the data to be transmitted during the initial resource selection process. The specific number of resources selected depends on the system configuration and the amount of data to be transmitted. If N resources are temporarily selected, the UE will indicate reservation for other N−1 resources through the SCI transmitted on the first resource to achieve the purpose of resource announcement. Here, only the first resource cannot be announced in advance through SCI, the following N−1 resources can be announced in advance through SCI.

Step 2: If the UE temporarily selects one resource for the data to be transmitted, before the actual use of this resource, under certain conditions, the UE may initiate resource reselection at a time point; if the UE temporarily selects N resources for the data to be transmitted, before the actual use of the first resource, under certain conditions, the UE may initiate resource reselection, that is, before the resource announcement (indicating reservation for the selected resource through SCI), the UE may initiate resource rese-lection at a time point.

If the resource temporarily selected by the UE is reserved by other UE through the SCI indication, where the SCI is received after the initial resource selection and before the resource announcement, that is, the UE will collide with other UE on the temporarily selected resource, and when a certain condition is met, the UE should trigger resource reselection, release the resource that has been temporarily selected but reserved by other UE, and reselect the resource to replace the released resource, that is, the number of reselected resources is the same with the number of the resources to be released due to collision.

Step 3: If the UE temporarily selects N resources for the data to be transmitted, after the resource announcement (indicating reservation for the selected resources through SCI), the UE may initiate resource reselection at a time point under certain conditions.

If the resource already announced by the UE is reserved by other UE through the SCI indication, where the SCI is received after the resource announcement and before the actual use of the announced resource, under certain condi-tions, the UE should trigger resource reselection, release the resource that has been announced previously but reserved by other UE, and reselect resource to replace the released resource, that is, the number of reselected resources is the same with the number of resources to be released due to collision. This process is also called pre-emption.

Initial Resource Selection

If new data arrive at the UE, but there is no available resources, or no enough available resources for the UE to transmit the data, the UE should initiate an initial resource selection for the data to be transmitted. The resource selec-tion process may generally include two steps, which are called Step 1 and Step 2 respectively.

In Step 1, the UE evaluates each resource in the resource selection window based on the SCI successfully received in the sensing window and the measured RSRP. Under certain conditions, some resources are excluded. For example, if a resource is reserved by other UE through SCI indication, and the RSRP associated with the corresponding SCI is higher than the threshold, then the resource is excluded. After the resource is excluded, the number of remaining resources should be guaranteed to be at least above a certain ratio. If the number of remaining resources does not meet a certain ratio, the RSRP threshold for excluding resources is increased by 3 dB, and the process of excluding resources is repeated. Here, the initial RSRP threshold is jointly precon-figured based on the UE's own data priority and the data priorities of other UEs that preemptively indicate resource reservation through the SCI. In Step 1, resources that do not meet the conditions in the resource selection window are excluded mainly, in which the specific processes included are not described in detail here. The approximate processes may refer to steps 101 to 104 in FIG. 1.

In Step 2, the UE selects 1 or N resources for the data to be transmitted from the remaining resources after some resources are excluded in Step 1. For example, the remain-ing resources are ordered according to the RSSI measured in the sensing window, or the remaining resources are ordered according to the sequence of the resources in domain, or the remaining resources are ordered according to the weighting for the RSSI measured in the sensing window and the sequence of the resources in domain. After finishing the resource ordering, UE randomly selects the first one or N resources from a certain number of resources. The specific processes included in Step 2 are not described in detail here, and the approximate processes may refer to steps 105 to 107 in FIG. 1.

The above resource reselection process before the resource announcement and the resource reselection process after the resource announcement also repeat Step 1 and Step 2 included in the initial resource selection process, but the specific details may be different.

Figure 3:
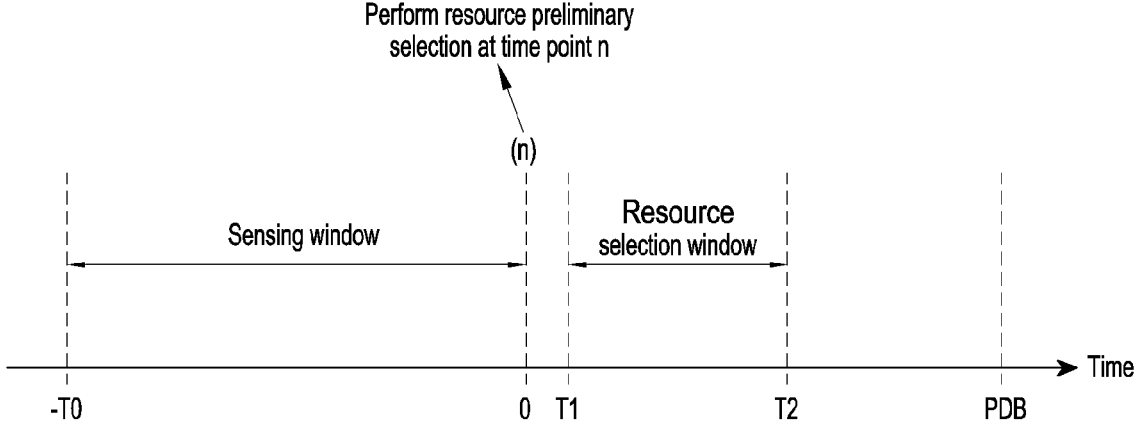
FIG. 3 is a schematic diagram of a time relationship diagram of a resource selection process according to an embodiment of the present application.

FIG. 3 is a schematic diagram of the time relationship diagram of the resource selection process. The UE performs resource selection at a time point n. According to the sensing results in the sensing windows n-T0~n before the time point n, the UE selects 1 or more resources for the data to be transmitted in the resource selection window n+T1~n+T2 after the time point n. Wherein, the resource selection window should not be later than the Packet Delay Budget (PDB), that is, n+T2≤PDB. Here, n is assumed to be the time origin 0.

2. Sensing Window for Resource Preliminary Selection

As shown in FIG. 3, the sensing window for the resource preliminary selection is n-T0~n, assuming that n is the time origin 0, then the length of the sensing window is T0, where the value of T0 is predefined or preconfigured.

Optionally, the unit of T0 is a time slot and is a physical time slot, that is, the sensing window includes a time slot that is not configured for sidelink transmission, in addition to the time slot that is configured for sidelink transmission.

Optionally, the unit of T0 is absolute time, for example, the unit of T0 is millisecond, then the number of physical time slots included in the sensing window is related to the subcarrier spacing used in the system, that is, the UE determines the number of physical time slots contained in the sensing window according to the subcarrier spacing and the predefined or preconfigured T0 value.

Optionally, the value of T0 is predefined, for example, the value of T0 is predefined as 1000 time slots, that is, T0 is fixed as 1000 time slots in any case. That is, T0 is the same for different resource pools, different UEs on the same resource pool, and different priorities of data services to ensure the fairness of resource selection.

Optionally, the value of T0 is configurable, and T0 is configured for each resource pool, that is, the resource selection process on different resource pools may use dif-ferent T0 values. For example, when the time slots config-ured for sidelink transmission in the resource pool are sparse, T0 may be configured with a larger value to ensure that enough sidelink time slots are measured in the sensing window.

Optionally, the value of T0 is configurable, and T0 is configured for each UE, that is, different UEs on the same resource pool may use different T0 values. For example, a UE with more services may be configured with a smaller T0 value to reduce the overall time of resource sensing.

Optionally, the value of T0 is configurable, and T0 is configured for each priority of the data service, that is, the same UE may use different T0 values for data services of different priorities. For example, a data service of higher priority may be configured with a smaller T0 value to reduce the overall time of resource sensing.

Optionally, the value of T0 is configurable, and T0 is configured for each Channel Busy Ratio (CBR) range on the resource pool, that is, the same resource pool may use different T0 values in different CBR ranges. For example, a higher CBR range may be configured with a larger T0 value to reduce the probability of resources collision.

3. Resource Selection Window for Resource Preliminary Selection

As shown in FIG. 3, the resource selection window for resource preliminary selection is n+T1~n+T2, that is, the earliest time point at which the UE may select resource is n+T1, and the latest time point at which the UE may select resource is n+T2, the length of the resource selection window is T2-T1. Here, the value of T1 is predefined or preconfigured, and the minimum and/or maximum values of T2 is predefined or preconfigured.

The UE needs to take certain processing time during the process of the resource selection. The resources in this processing time cannot be selected. Assuming that the processing time of the resource selection process is Tproc, then the resources in windows n~n+Tproc cannot be included in the resource selection window. For different UEs, Tproc values may be different due to different implementations. The system specifies a maximum value of Tproc, that is, the processing time of the resource selection process of all UEs should not exceed the maximum Tproc value specified by the system.

Optionally, the system specifies that the value of T1 is the above-mentioned maximum Tproc value, that is, T1=Tproc-max. All UEs on the same resource pool use the same T1 value, even if the processing time of the resource selection process of some UEs may be less than the maximum Tproc value specified by the system.

Optionally, the system specifies that the value of T1 is less than or equal to the above-mentioned maximum Tproc value, that is, T1≤Tproc-max. The actually used T1 value depends on the processing time of the resource selection process of the UE, that is, depends on the implementation of the UE, different UEs on the same resource pool may use different T1 values.

In one example, the unit of the above-mentioned maximum Tproc value (that is, the maximum T1 value) is a time slot or an OFDM symbol. That is, the minimum granularity of Tproc (T1) is one time slot or one OFDM symbol. Different subcarrier spacing should use different maximum values of Tproc (that is, the maximum T1 value).

In another example, the unit of the above-mentioned maximum Tproc value (that is, the maximum T1 value) is an absolute time, that is, the number of time slots or OFDM symbols included within the maximum Tproc time is determined by the subcarrier spacing and the maximum Tproc value.

Optionally, the system specifies the minimum value T2-min and/or the maximum value T2-max for the above-mentioned T2, that is, T2≥T2-min; or T2≤T2-max; or T2-min≤T2≤T2-max. In particular, the system specifies that T2-max is the PDB of the data, that is, T2-max=PDB, T2≤PDB. The PDB of data service is predefined or preconfigured. For example, the PDB may be 50 ms or 100 ms, then the T2-max may be 50 ms or 100 ms. Optionally, different PDB values may be configured for different Quality of Service (QoS) of the data service; and/or different PDB values may be configured for different priorities of the data service. Optionally, the T2-min value is predefined, and T2-min is related to the maximum time interval between the first resource and the last resource indicated in the SCI, for example, T2-min=T1+Time-Gap-max; or T2-min=T1-max+Time-Gap-max, where Time-Gap-max is the maximum time interval between the first resource and the last resource indicated in the SCI.

The SCI should indicate at least one PSSCH resource, that is, in addition to indicating the PSSCH resources associated with the current SCI, the SCI may also indicate other reserved PSSCH resources. When the SCI indicates multiple resources, the maximum time interval Time-Gap-max between the first resource and the last resource is predefined or preconfigured. For example, the maximum time interval may be 16 ms or 32 ms, that is, T2-min may be 16 ms or 32 ms.

Optionally, the maximum time interval Time-Gap-max between the first resource and the last resource indicated in the SCI is related to the maximum number of resources indicated in the SCI. For example, the maximum number of resources indicated in the SCI is preconfigured and the system specifies the maximum time interval between two adjacent resources indicated in the SCI, then the maximum time interval between the first resource and the last resource indicated in the SCI is determined by the product of the maximum number of resources indicated in the SCI and the maximum time interval between two adjacent resources. In another example, the maximum time interval between the first resource and the last resource indicated in the SCI is independent of the maximum number of resources indicated in the SCI.

Optionally, the maximum time interval Time-Gap-max between the first resource and the last resource indicated in the SCI is related to whether these two resources are used for the same TB transmission. For example, when multiple resources indicated in the SCI are configured to be used for the same TB transmission, the maximum time interval between the first resource and the last resource is 16 ms; when multiple resources indicated in the SCI are configured to be used for different TB transmissions, the maximum time interval between the first resource and the last resource is 32 ms.

Optionally, the T2-min value and/or the T2-max value are preconfigured. For example, different T2-min values and/or T2-max values may be configured for different resource pools; and/or different T2-min values and/or T2-max values may be configured for different priorities of data services; and/or, different T2-min values and/or T2-max values may be configured for different UEs; and/or different T2-min values and/or T2-max values may be configured for different numbers of resources to be allocated in the resource selection process; and/or, different T2-min values and/or T2-max values may be configured for different maximum retransmission times; and/or, different T2-min values and/or T2-max values may be configured for blind retransmission and HARQ feedback-based retransmission.

Optionally, the T2 value should satisfy the above-mentioned ranges of T2-min and/or T2-max, and the actually used T2 value depends on the implementation of the UE.

Optionally, the T2 value should satisfy the above-mentioned ranges of T2-min and/or T2-max, and the actually used T2 value is determined by the UE according to a predefined rule. For example, the UE should randomly select a value within T2-min~T2-max as the actually used T2 value; or, the UE decides the actually used T2 value according to any one or more of the data priority, the range of amount of data arriving, the number of resources to be allocated, the maximum number of retransmissions, whether to use blind retransmission or HARQ feedback-based retransmission.

Optionally, the T2 value is predefined, for example, T2=PDB. That is, the resource selection window is ended at PDB.

Optionally, the T2 value is preconfigured, for example, different T2 values may be configured for different resource pools; and/or different T2 values may be configured for different UEs; and/or different T2 values may be configured for the different priorities of data services; and/or, different T2 values may be configured for different ranges of amount of data arriving; and/or, different T2 values may be configured for different numbers of resources to be allocated; and/or, different T2 values may be configured for different maximum retransmission times; and/or, different T2 values may be configured for blind retransmission and HARQ feedback-based retransmission.

4. Resource Reselection Before Resource Announcement

During the resource selection process, the UE temporarily selects 1 or N (N>1) resources in the resource selection window n+T1~n+T2 at the time point n for the data to be transmitted. If the UE selects N resources temporarily, it will indicate in the SCI transmitted on the selected first resource that other N−1 resources are reserved to achieve the purpose of resource reservation. Resource reservation is also called resource announcements.

Before the UE indicates reservation for the temporarily selected resource through the SCI, this resource may be pre-empted by other UE through the SCI. If the UE continues to use the temporarily selected resource, the two UEs may collide on this resource. If the two UEs are far away, that is, a RSRP level between the two UEs is low, then the interference level therebetween is low, and the collision that will occur has no effect on the data transmission of both, then the UE may continue use this temporarily selected resource. However, if the two UEs are close, that is, the RSRP level between the two UEs is high, then the interference level therebetween is high, and the collision that will occur has effect on the data transmission of both, then the UE should release this temporarily selected resource and initiate a resource reselection process.

Figure 4:
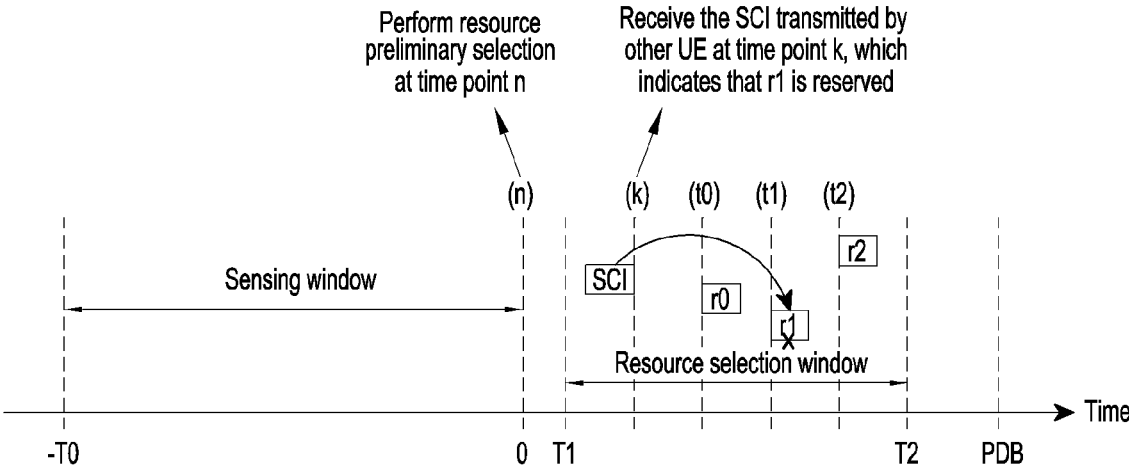
FIG. 4 is a schematic diagram of the temporarily selected resource reserved by other UE through SCI according to an embodiment of the present application.

As shown in FIG. 4, the UE performs a resource preliminary selection at time point n, and temporarily selects 3 resources in the resource selection window n+T1~n+T2, which are r0, r1, and r2 respectively, and the corresponding time points are t0, t1, and t2. Before the time point t0, the UE may receive the SCI transmitted by other UE, and the SCI indicates that one or more among r0, r1, and r2 are reserved, that is, the resources reserved (announced) by other UEs through SCI indications will collide with the resources temporarily selected by the UE. As shown in FIG. 4, the UE receives the SCI transmitted by other UE at time point k, which indicates that r1 is reserved. Under certain conditions, the UE should trigger resource reselection for resource r1, that is, the UE reselects the resource to replace resource r1. The time in FIG. 4 is the time point.

5. Triggering Conditions for Resource Reselection Before Resource Announcement

The conditions that trigger resource reselection may be related to one or more of the priorities of the data of both the UE and a UE to be collided, the RSRP level of the UE to be collided, the number of resources to be collided, and the location of the resources to be collided.

The triggering condition of the resource reselection may be related to the priority of the data to be transmitted of the UE and the priority of the data of the UE to be collided indicated through the SCI. Specifically, the triggering condition for resource reselection may be any one of the following:

Optionally, the UE triggers resource reselection only if the priority of the data to be transmitted of the UE is lower than or equal to the priority of the data of the UE to be collided indicated through the SCI;

Optionally, the UE triggers resource reselection only if the priority of the data to be transmitted of the UE is lower than the priority of the data of the UE to be collided indicated through the SCI;

Optionally, the UE triggers resource reselection only if the condition that the priority of the data to be transmitted of the UE is lower than the priority of the data of the UE to be collided indicated through the SCI, and the difference between the priorities of the both is higher than or equal to predefined or preconfigured threshold, is met;

Note: In the NR system, the smaller the priority value indicated in the SCI, the higher the priority of the corresponding data; the larger the priority value indicated in the SCI, the lower the priority of the corresponding data.

A condition for triggering resource reselection may be related to a signal strength between two UEs that will collide with each other, that is, related to a measured RSRP level of the UE to be collided. Here, the RSRP is obtained based on the measurement of the PSSCH DMRS.

Optionally, the UE may trigger resource reselection only if the condition that the measured RSRP of the UE to be collided is higher than a preconfigured threshold is met. Here, the RSRP threshold is related to the priority of the data to be transmitted of the UE and the priority of the data of the UE to be collided indicated in the SCI, that is, the RSRP threshold is determined according to the two priorities. The system configures different RSRP thresholds based on different values or ranges of the two priorities.

Optionally, the above-mentioned RSRP threshold for judging whether the resource is released to trigger resource reselection is the same as the RSRP threshold for excluding resources in Step 1 of the resource preliminary selection process described above. The former RSRP threshold may use the adjusted RSRP threshold in Step 1, that is, the RSRP threshold may be adjusted based on the preconfigured initial RSRP threshold; or, the former RSRP threshold may use the initial RSRP threshold preconfigured in Step 1.

Optionally, the above-mentioned RSRP threshold for judging whether resource is released to trigger resource reselection is different from the RSRP threshold for excluding resources in Step 1 of the resource preliminary selection process described above, and they are configured separately.

The condition for triggering resource reselection may be related to the number of resources to be collided. Here, the resources to be collided meet the above-mentioned triggering conditions related to the data priority. For example, the condition that the data priority of the UE to be collided indicated in the SCI is higher than the priority of the data to be transmitted of the UE itself is met; and/or, the resource to be collided meets the above-mentioned triggering conditions related to the RSRP of the UE to be collided, for example, the condition that the measured RSRP of the UE to be collided is higher than the threshold is met. Specifically, the condition for triggering resource reselection is any of the following:

Optionally, the UE triggers resource reselection only if any resource temporarily selected by the UE collides with a resource announced by other UE.

Optionally, the UE triggers resource reselection only if the condition that all the resources temporarily selected by the UE will collide with resources announced by other UEs is met.

Optionally, the UE may trigger resource reselection only if the condition that the number of resources that will collide with resources announced by other UEs among resources temporarily selected by the UE is greater than or equal to a predefined or preconfigured threshold is met. The predefined or preconfigured threshold may be related to the priority or QoS of the data, and the higher priority or higher QoS may have a smaller threshold. The threshold may be an absolute number or a relative ratio based on the total number of temporarily selected resources.

Optionally, the UE triggers the resource reselection only if the number of the remaining resources after excluding the resources that will collide with resources announced by other UEs from the resources temporarily selected by the UE is less than or equal to a predefined or preconfigured threshold. The predefined or preconfigured threshold may be related to the priority or QoS of the data, and the higher priority or higher QoS of the data may have a higher threshold; and/or, the predefined or preconfigured threshold may be related to the amount of data to be transmitted. The larger the amount of data to be transmitted, the larger the threshold may be. The threshold may be an absolute number or a relative ratio based on the total number of temporarily selected resources.

Optionally, the UE triggers resource reselection only if the condition is met, in which the number of the remaining resources after excluding the resources that will collide with resources announced by other UEs from the resources temporarily selected by the UE is less than the number of the transport blocks to be transmitted, or is insufficient to support at least one transmission of the data to be transmitted.

The condition that triggers resource reselection may be related to the location of the resource to be collided. Optionally, the UE triggers resource reselection only if the condition is met, in which the first resource temporarily selected by the UE and a resource announced by other UE will collide.

The system may use one or more of the above-mentioned triggering conditions for resource reselection. When there are multiple triggering conditions, the UE triggers resource reselection only when multiple conditions are met simultaneously. Optionally, the system defines multiple triggering conditions for resource reselection, and the specific triggering condition to be used is preconfigured. For example, the triggering condition for resource reselection may be configured as one or more of the above-mentioned triggering conditions for resource reselection.

6. The Timing Relationship Between a Triggering Time Point and a Performing Time Point of Resource Reselection Before Resource Announcement Optionally, the UE performs resource reselection immediately after triggering the resource reselection, that is, the time point m' at which the resource reselection is triggered is the same as the time point m at which the resource reselection is performed. Therefore, triggering resource reselection and performing resource reselection may be considered as the same event. Specifically, the following optional schemes are available:

In one example, the time point at which the resource reselection may be performed is the time point at which the SCI, transmitted by other UE, indicating that the reserved resource and the resource temporarily selected by the UE will collide is successfully received. Considering that it takes processing time for the UE to receive and decode the SCI, the time point at which the UE successfully decodes the SCI is not the time point at which the SCI is received. For example, other UE transmits the SCI indicating that the reserved resource will collide with the resource temporarily selected by the UE at time point s, and assuming that the processing time of receiving and decoding for SCI is Tde-code, the UE successfully receives the SCI at time point s+Tdecode, that is k=s+Tdecode.

Figure 5:
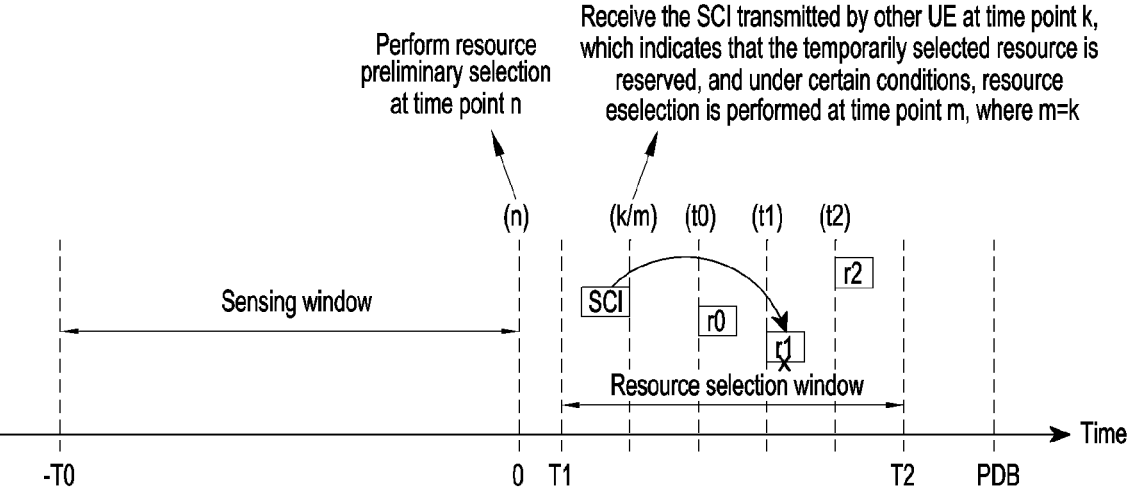
FIG. 5 is a schematic diagram of time point at which a resource reselection is triggered according to an embodiment of the present application.

As shown in FIG. 5, the UE successfully receives the SCI transmitted by other UE at time point k. The SCI indicates that resource r1 is reserved. If the condition that triggers resource reselection is met, the UE should perform resource reselection at time point k. The time in FIG. 5 is the time point.

In another example, the time point at which resource reselection may be performed is a predefined time point before the first resource r0 is temporarily selected by the UE, such as t0-Tp, where Tp is a predefined or preconfigured value. Optionally, the system specifies Tp=Tprepare+Tproc'; or, the system specifies Tp=Tprepare. Wherein, Tprepare is the preparation time for PSCCH/PSSCH transmission, and Tproc' is the processing time for performing resource reselection. The processing time took by the UE in the resource reselection process in the second step may be less than the processing time took in the resource selection process in the first step, that is, Tproc'≤Tproc.

Figure 6:
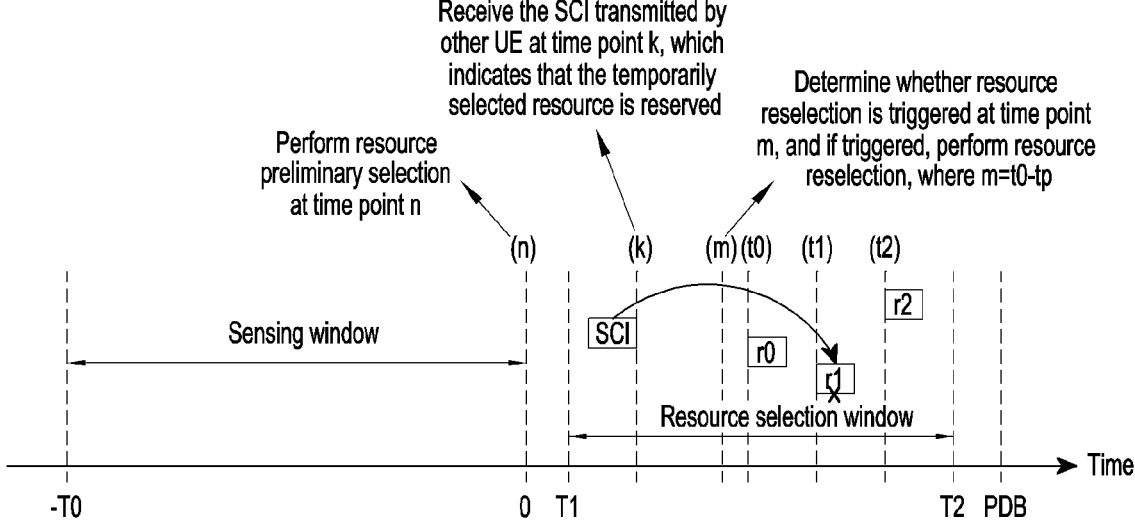
FIG. 6 is a schematic diagram of time point at which a resource reselection is triggered according to an embodiment of the present application.

As shown in FIG. 6, the UE receives SCI transmitted by other UE at time point k. The SCI indicates that the resource r1 is reserved. The UE determines whether the resource reselection is triggered at time point t0-Tp, that is, determines whether the temporarily selected resource will collide with other UE. If there is a resource that will collide with another UE and the above-mentioned condition for triggering resource reselection is met, the UE performs resource reselection at time point t0-Tp, that is, m=t0-Tp. The time in FIG. 6 is the time point.

Optionally, the UE does not perform resource reselection immediately after triggering the resource reselection, until a specific time point, that is, the time point m' at which the resource reselection is triggered and the time point m at which the resource reselection is performed are different. Therefore, triggering of resource reselection and performing of resource reselection are two different events. Here, the time point m' at which the resource reselection may be triggered is the time point at which the SCI, transmitted by another UE, indicating that the reserved resource and the resource temporarily selected by the UE will collide is successfully received, if the condition that triggers the resource reselection is met. The time point m at which the resource reselection is performed may be determined by any of the following methods:

In one example, after the resource reselection is triggered at the time point m', the UE does not perform resource reselection immediately, until a predefined time point before the temporarily selecting of first resource r0, such as t0-Tp, where Tp is a predefined or preconfigured value. Optionally, the system specifies Tp=Tprepare; or, the system specifies Tp=Tprepare+Tproc', where Tprepare is a preparation time for PSCCH/PSSCH transmission, and Tproc' is a processing time for performing resource reselection.

Here, before the UE performs resource reselection at time point m, the UE may trigger multiple resource reselections, that is, the UE may trigger resource reselection at different time points m' because different resources will collide, then when the UE performs resource reselection at time point m, it needs to reselect multiple resources to replace the resources to be collided. Therefore, multiple resource reselection triggering events at different time points correspond to one resource reselection performing event at the same time point, which is why the resource reselection is not performed immediately when triggered, so as to reduce the times of the resource reselection for the UE.

Figure 7:
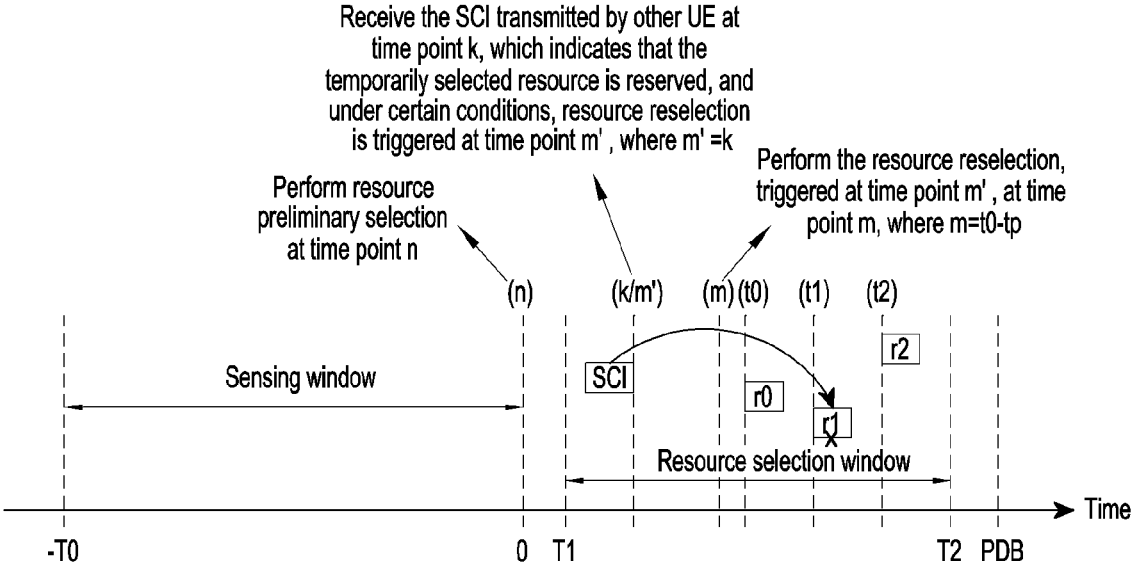
FIG. 7 is a schematic diagram of time point at which a resource reselection is triggered according to an embodiment of the present application.

As shown in FIG. 7, the UE receives the SCI transmitted by another UE at time point k. The SCI indicates that resource r1 is reserved. Under certain conditions, the UE triggers resource reselection at time point k, that is, m'=k, after the resource reselection is triggered, the UE will wait until the time point t0-Tp to perform the resource reselection, that is, m=t0-Tp. The time in FIG. 7 is the time point.

Optionally, the UE decides at which time point to perform resource reselection according to whether the resource to be collided contains r0. If the reason for triggering resource reselection is that the UE will collide with another UE on the resource r0, the UE performs resource reselection at time point t0-Tprepare, that is, m=t0-Tprepare. The purpose of reserving Tprepare is to have time to cancel the transmission of PSCCH/PSSCH on the resource r0; if the reason for triggering resource reselection is that the UE will collide with other UE on resources other than resource r0, the UE performs resource reselection at time point t0-Tprepare-Tproc', that is, m=t0−Tprepare−Tproc'. The purpose of reserving Tprepare and Tproc' is to have time to reserve the reselected resource through the SCI indication transmitted on the first resource r0.

Figure 8:
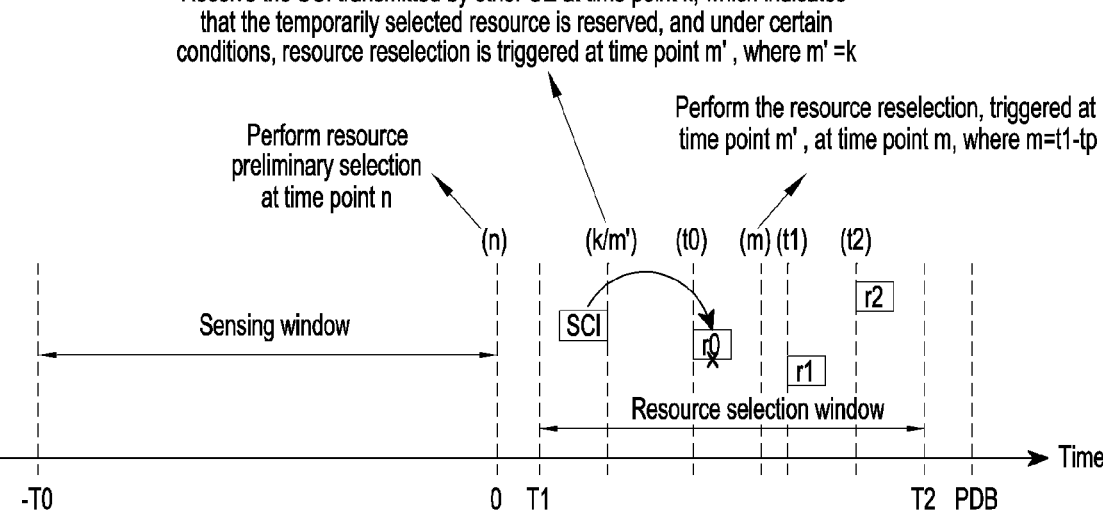
FIG. 8 is a schematic diagram of time point at which a resource reselection is triggered according to an embodiment of the present application.

Optionally, after the UE triggers the resource reselection at the time point m', the UE does not perform the resource reselection immediately, but waits until a predefined time point before the first available resource to perform the resource reselection. As shown in FIG. 8, the UE receives the SCI transmitted by other UE at time point k, and the SCI indicates that resource r0 is reserved, then the UE performs resource reselection at time point t1-Tp before the first available resource r1, where, Tp is a predefined or preconfigured value. Optionally, the system specifies Tp=Tprepare; or, the system specifies Tp=Tprepare+Tproc', where Tprepare is a preparation time for PSCCH/PSSCH transmission, and Tproc' is a processing time for performing resource reselection.

In FIG. 8, if the resource r1 is reserved by other UE preemptively through the SCI indication before the time point t1-Tp, the UE may perform resource reselection at the time point t2-Tp before the time point of the next available resource r2. If the resource r2 is also reserved by other UE preemptively through the SCI indication before the time point t2-Tp, that is, all resources temporarily selected are reserved by other UE preemptively through the SCI indication, then the UE performs resource reselection at a time point t2-Tp before the time point t2 of the last resource r2 which is determined to be collided; or the UE performs resource reselection at the time point when the last SCI indicating that the resource to be collided is received successfully; or the UE performs resource reselection at the end time point T2 of the resource selection window. The time in FIG. 8 is the time point.

Optionally, after the UE triggers the resource reselection at the time point m', the specific time point m at which the resource reselection is performed depends on the UE implementation, but it cannot later than the predefined time point before the temporarily selecting of first resource r0, for example m≤t0-Tp; or, cannot later than a predefined time point Tp before the first available resource, where Tp is a predefined or preconfigured value. Optionally, Tp=Tprepare or Tp=Tprepare+Tproc', where Tprepare is a preparation time for PSCCH/PSSCH transmission, and Tproc' is a processing time for performing resource reselection.

7. Maximum Number of Resource Reselections Before Resource Announcement

The UE triggers the resource reselection because the resource temporarily selected by the UE will collide with resource announced by other UE. After the UE performs resource reselection, another resource that is not to collide temporarily among the resources selected by the UE at time point n and that is reselected at time point m may also collide with resource announced by other UE again, thereby the resource reselection is triggered again, that is, the UE may trigger the resource reselection again after performing resource reselection and before final announcing of resource, then the resource reselection is performed again.

Optionally, the system specifies that the UE only performs resource reselection at most once before final announcing of resource.

Optionally, the system specifies the maximum number of times that the UE can perform the resource reselection before final announcing of resource. The maximum number of times can be predefined or preconfigured. The system may configure different maximum number of times of resource reselections for different resource pools; and/or, configure different maximum number of times of resource reselections for different UEs; and/or, configure different maximum number of times of resource reselections for different priorities of data.

In one example, after the actual number of resource reselections reaches the maximum, if a selected resource collides with a resource announced by another UE again, the UE ignores possible collisions on this resource, and may still reserve for this resource indicated through SCI and continue to use this resource, and there is no special handling for the transmit power of PSCCH/PSSCH transmitted on this resource.

In another example, after the actual number of resource reselections reaches the maximum, if a selected resource collides with a resource announced by another UE again, the UE ignores possible collisions on this resource, and may still reserve for this resource indicated through SCI and continue to use this resource, and it needs special handling for the transmit power of PSCCH/PSSCH transmitted on this resource.

For example, if the priority of data to be transmitted of UE is higher than the priority of data of another UE to be collided, and/or the RSRP of the another UE measured by the UE is lower than a preconfigured threshold, then the transmit power of PSCCH/PSSCH transmitted by the UE on this resource may be increased to counteract possible interference and ensure the reliability of the transmission; if the priority of the data to be transmitted of the UE is lower than that of the data of another UE to be collided, and/or the RSRP of the other UE measured by the UE is higher than the preconfigured threshold, then the transmit power of the PSCCH/PSSCH transmitted by the UE on the resource is adjusted to be lower to reduce the interference level to another UE. Wherein, the adjustment amount (increased amount or decreased amount) of the transmit power of the PSCCH/PSSCH transmitted on this resource is predefined or preconfigured, and the adjustment amount should be related to at least one of the RSRP level of the UE to be collided, the priority of the data of the UE to be collided indicated in the SCI, and the priority of the data to be transmitted.

8. Sensing Window for Resource Reselection Before Resource Announcement

The resource reselection process is similar to the initial resource selection process, and also includes the above-mentioned Step 1 and Step 2. Similarly, the resource reselection process will also have a corresponding sensing window and resource selection window, that is, based on the detection information in the corresponding sensing window, resources are reselected for the data to be transmitted in the corresponding resource selection window, and the number of reselected resources is equal to the number of resources to be collided.

Figure 9:
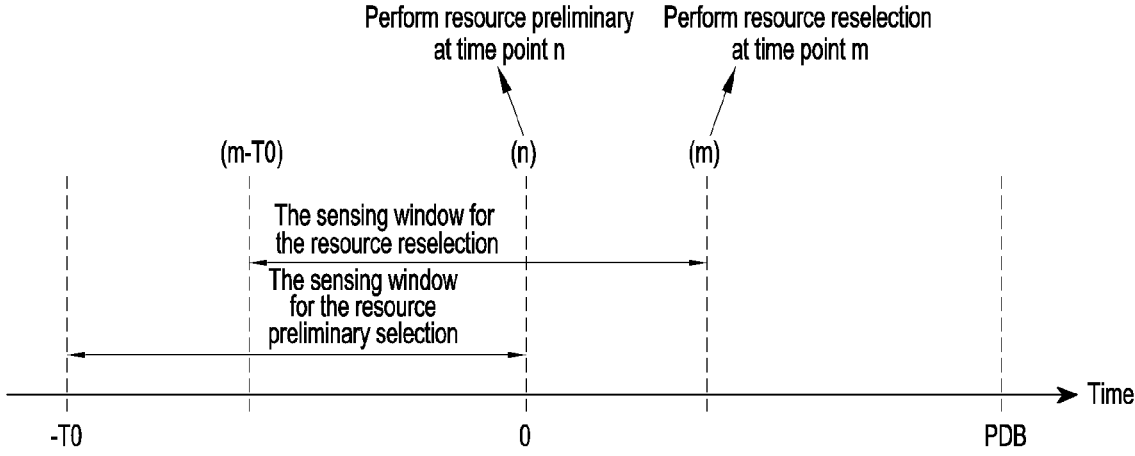
FIG. 9 is a schematic diagram of a sensing window for resource reselection according to an embodiment of the present application.

Optionally, the sensing window for resource reselection is the translation of the sensing window for the resource preliminary selection, that is, the windows n-T0~n are translated from the time point n to the time point m. As shown in FIG. 9, the sensing window of the resource reselection process performed at time point m is m-T0~m. The time in FIG. 9 is a time point.

Figure 10:
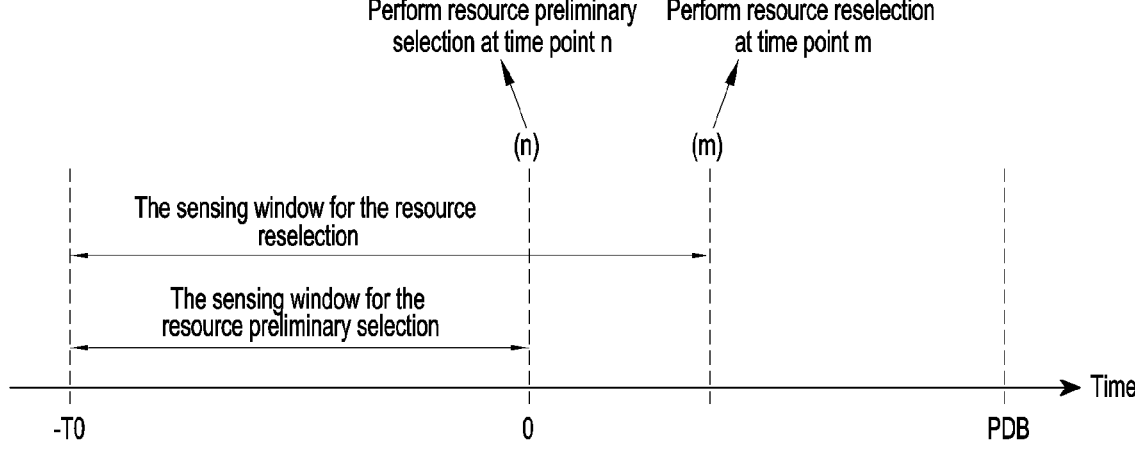
FIG. 10 is a schematic diagram of a sensing window for resource reselection according to an embodiment of the present application.

Optionally, the sensing window for resource reselection includes the time after the time point n and before the time point m in addition to the sensing window for the resource preliminary selection. As shown in FIG. 10, the sensing window of the resource reselection process performed at time point m is n-T0~m. The time in FIG. 10 is a time point.

Figure 11:
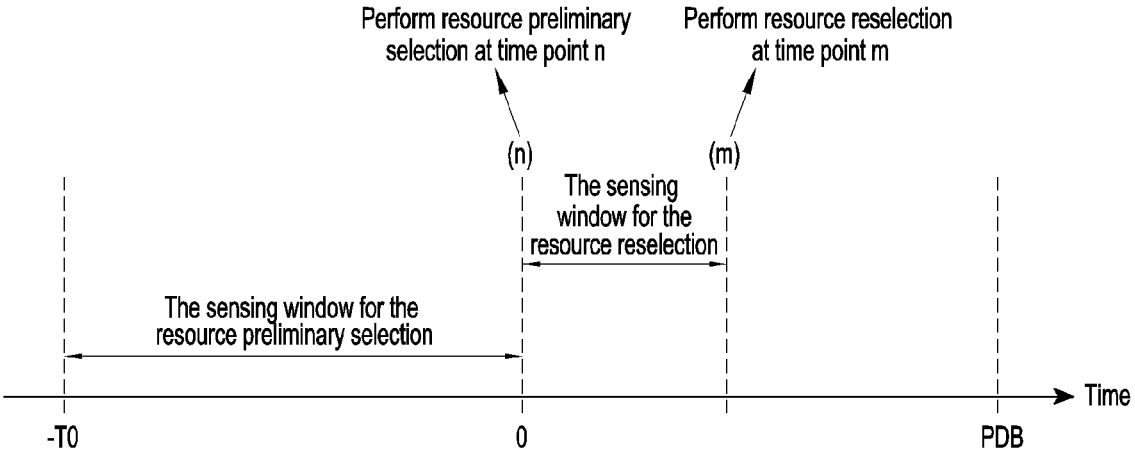
FIG. 11 is a schematic diagram of a sensing window for resource reselection according to an embodiment of the present application.

Optionally, the sensing window for resource reselection includes only the time after the time point n and before the time point m. As shown in FIG. 11, the sensing window of the resource reselection process performed at time point m is n~m. The time in FIG. 11 is a time point.

Figure 12:
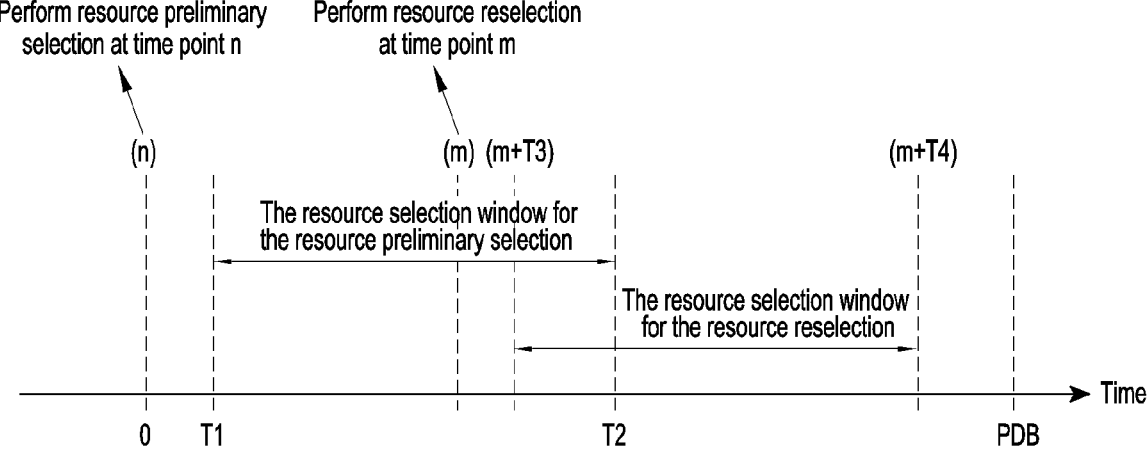
FIG. 12 is a schematic diagram of a resource selection window for resource reselection according to an embodiment of the present application.

9. Resource Selection Window for Resource Reselection Before Resource Announcement Similar to resource preliminary selection, resource reselection also has a corresponding resource selection window. For ease of description, the resource selection window of the resource reselection process performed at time point m may be set to m+T3~m+T4, as shown in FIG. 12. The time in FIG. 12 is a time point.

Wherein, the starting point T3 of the resource selection window for resource reselection is determined has a similar meaning to the starting point T1 of the resource selection window of the resource preliminary selection process. That is, T3 is determined by the processing time Tproc' of the resource reselection process, T1 is determined by the processing time Tproc of the resource preliminary selection process, where Tproc' and Tproc may be the same or different. Optionally, the system specifies T3=T1, that is, the system specifies that the maximum processing time Tproc-max of the resource preliminary selection process is the same as the maximum processing time Tproc'-max of the resource reselection process. Optionally, the system specifies T3=T1, that is, the system specifies that the maximum processing time Tproc-max of the resource preliminary selection process is different from the maximum processing time Tproc'-max of the resource reselection process, which is similar to the method for determining the T1 value described above, T3=Tproc'-max; or, T3≤Tproc'-max, and the specific T3 value depends on the implementation of the UE.

Optionally, the ending point T4 of the resource selection window for resource reselection is determined has the same minimum and/or maximum value as the ending point T2 of the resource selection window for resource preliminary selection, that is, T4-min=T2-min, and/or T4-max=T2-max, but the actual values of T4 and T2 may be different. For example, the actual values of T2 and T4 depend on the implementation of the UE and may be the same or different; or the actual values of T2 and T4 depend on the number of resources that need to be allocated. Because the number of resources to be allocated during the resource reselection process is less than or equal to the number of resources to be allocated during the resource preliminary selection process, the actual value of T4 should be less than or equal to the actual value of T2. Therefore, the length of the resource selection window for resource reselection should be less than or equal to the length of the resource selection window for resource preliminary selection.

Optionally, the resource selection window of the resource preliminary selection is translated to the time point m as the resource selection window of the resource reselection, that is, the window of the time point m+T1~m+T2. Therefore, the length of the resource selection window for resource preliminary selection is exactly the same as the length of the resource selection window for resource reselection. It should be noted, if m+T2>PDB, then the resource selection window is m+T1~PDB, that is, the resource selection window does not exceed PDB at the latest.

Figure 13:
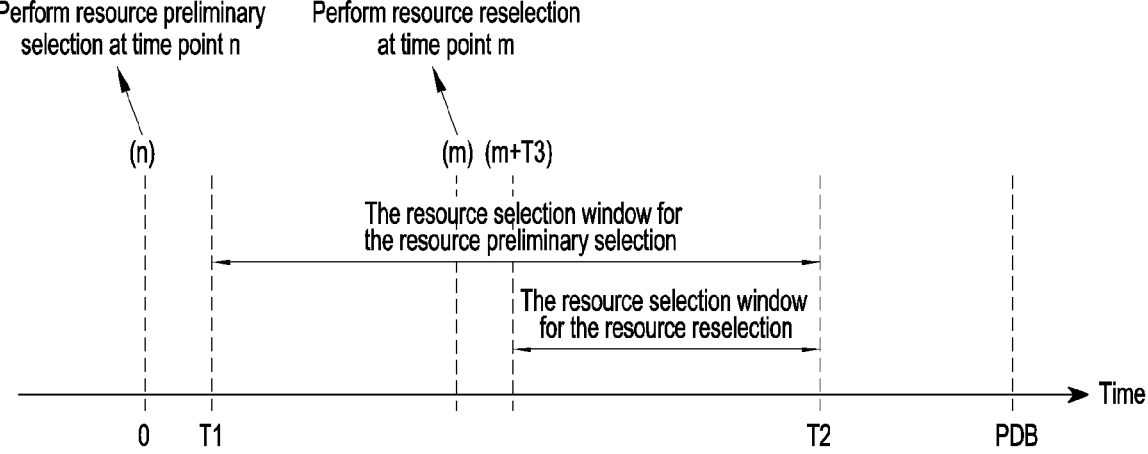
FIG. 13 is a schematic diagram of a resource selection window for resource reselection according to an embodiment of the present application.
Figure 14:
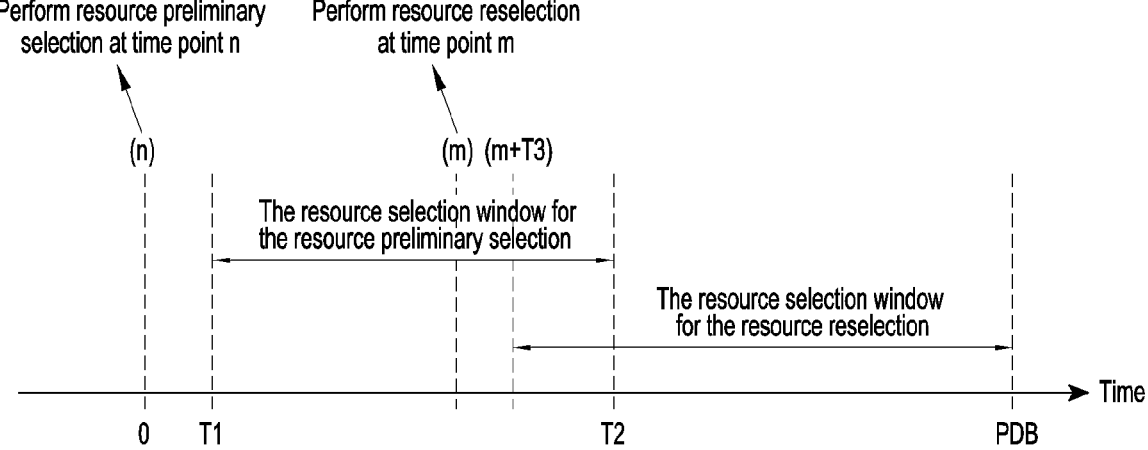
FIG. 14 is a schematic diagram of a resource selection window for resource reselection according to an embodiment of the present application.

Optionally, the resource selection window for resource reselection reuses the remaining available time in the resource selection window for the resource preliminary selection. As shown in FIG. 13, the resource selection window for the resource reselection process performed at time point m is m+T3~n+T2. If T3=T1, then the resource selection window is m+T1~n+T2. The time in FIG. 13 is the time point. Optionally, the resource selection window for resource reselection includes all available times until the end of the PDB. As shown in FIG. 14, the resource selection window for the resource reselection process performed at time point m is m+T3~PDB. If T3=T1, the resource selection window is m+T1~PDB. The time in FIG. 14 is the time point.

10. Enable/Disable Status of Resource Reselection Function Before Resource Announcement The resource reselection function before the resource announcement may effectively avoid resource collision between two UEs, thereby reducing the interference level on the resource pool and improving the performance of the sidelink transmission, but the resource reselection also increases the implementation complexity of the UE. Optionally, the resource reselection function before the resource announcement may be enabled/disabled. When this function is enabled, the UE should determine whether the selected resource is preemptively announced by another UE before announcing the resource. If the selected resource is preemptively announced by another UE, when certain conditions are met, the UE should initiate resource reselection. When the function is disabled, the UE does not need to determine whether the selected resource is preemptively announced by other UE before announcing the resource. The UE always uses the selected resource for actual data transmission.

The enable/disable status of the resource reselection function before the resource announcement may be configured in any one or more of the following ways:

Optionally, the enable/disable status of the resource reselection function before the resource announcement may be configured for each resource pool, that is, different resource pools may have different configurations.

Optionally, the enable/disable status of the resource reselection function before the resource announcement may be configured for the CBR range on the resource pool, that is, for the same resource pool, when the CBR is higher, this function may be enabled, and when the CBR is lower, this function may be disabled.

Optionally, the enable/disable status of the resource reselection function before the resource announcement may be configured for each UE, that is, on the same resource pool, some UEs may be enabled with this function, while other UEs may be disabled with this function.

Optionally, the enable/disable status of the resource reselection function before the resource announcement may be configured for each priority of data or the range thereof, that is, for the same UE, when the priority of the data to be transmitted is higher, this function may be disabled, and when the priority of the data to be transmitted is lower, this function may be enabled.

11. Resource Reselection After Resource Announcement (That is Pre-emption)

After the UE indicates reservation for the selected resource through the SCI, this resource may be reserved by other UE through the SCI, that is, the same resource is reserved by two UEs through the SCI. If the two UEs are to transmit PSCCH/PSSCH on resources reserved by themselves, then the two UEs will collide on this resource. If the two UEs are far away, that is, the RSRP level between the two UEs is low, then the interference level between the two UEs is lower, the collision that will occur has no effect on the data transmission of both, then the two UEs can continue to use the reserved resource; but if the two UEs are close, the RSRP level between the two UEs is relatively high, then the interference level between the two UEs is high, and the collision that will occur may affect the data transmission of the two UEs, then one of the UEs should release the reserved resources and initiate a resource reselection process.

For the convenience of description, in the following, among the above two UEs, the earlier UE indicating reservation for resource through SCI is referred to as the first UE, and the later UE indicating reservation for resource through SCI is referred to as the second UE. The UE releasing reserved resources and initiating resource reselection shall referred to as the first UE, that is, the second UE has a higher transmission priority than the first UE. In the case where the first UE has reserved resources through the SCI, the second UE may still reserve the same resources through the SCI under certain conditions, that is, the resources reserved by the first UE are pre-empted by the second UE. For example, the condition for the second UE to preempt the resources reserved by the first UE may be: the priority of the data of the second UE is higher than the priority of the data of the first UE, and the second UE has no other more suitable available resource within the PDB.

12. Triggering Conditions for Resource Reselection After Resource Announcement

Similar to the resource reselection before the resource announcement, the triggering condition used for the resource reselection before the resource announcement may also be applied to the resource reselection after the resource announcement. For example, the triggering condition may be related to the priorities of two UEs that will collide with each other, and the RSRP level between the two UEs.

Optionally, the first UE triggers resource reselection only if the RSRP of the second UE measured by the first UE is higher than a preconfigured threshold. Here, the RSRP threshold is related to the data priorities of the first UE and the second UE.

Here, the RSRP threshold used to determine whether pre-emption triggers resource reselection is the same as the RSRP threshold used to determine whether resource reselection is triggered before resource announcement; or, the RSRP threshold used to determine whether pre-emption triggers resource reselection is the different from the RSRP threshold used to determine whether resource reselection is triggered before resource announcement, that is, they are configured separately.

In particular, if the pre-empted resource is reserved for data retransmission which is the HARQ feedback-based retransmission, then when the HARQ feedback received by the UE is ACK, the resource reserved for data retransmission will not be used. In this case, the UE may not initiate a resource retransmission for the pre-empted resource.

Optionally, when the time interval between the time point at which the UE successfully receives the SCI, indicating that resources are pre-empted, transmitted by other UE, and the maximum PDB of the data to be transmitted is greater than a predefined or preconfigured threshold, the UE initiates resource reselection.

Optionally, when a resource of the UE that will collide with that of another UE is used for the first transmission of a transport block of the UE, the UE initiates resource reselection.

13. Timing Relationship Between a Triggering Time Point and a Performing Time Point of Resource Reselection After Resource Announcement Similar to the resource reselection before the resource announcement, the method used to define the triggering time point of the resource reselection and/or the performing time point of the resource reselection before the resource announcement may also be applied to the resource reselection after the resource announcement.

Optionally, the first UE successfully receives the second UE's SCI at time point k indicating that the same resource is reserved, and the first UE initiates resource reselection at time point k under certain conditions.

Optionally, the first UE successfully receives the second UE's SCI at time point k indicating that the same resource is reserved, and under certain conditions, the first UE initiates resource reselection at a predefined time point Tp before the time point of the reserved resource. Where Tp=Tprepare, and Tprepare is the preparation time for PSCCH/PSSCH transmission.

Optionally, the first UE successfully receives the second UE's SCI at time point k indicating that the same resource is reserved, and under certain conditions, the time point when the first UE initiates resource reselection depends on the UE implementation, but no later than the predefined time point Tp before the time point of the reserved resource. Where Tp=Tprepare, and Tprepare is the preparation time for PSCCH/PSSCH transmission.

14. Maximum Number of Resource Reselections After Resource Announcement

When multiple resources are announced to be reserved by the SCI, multiple or all of the reserved resources may be pre-empted by other UEs. Then, after the resource announcement by the SCI, the UE may initiates multiple resource reselections due to the pre-emption. Similar to resource reselection before resource announcement, the number of resource reselections initiated due to pre-emption after resource announcement should be limited not to exceed the preconfigured maximum value. The method used to configure the maximum number of resource reselections before the resource announcement may also be applied to the resource reselection after the resource announcement.

15. Sensing Window for Resource Reselection After Resource Announcement

Similar to the resource reselection before the resource announcement, the method used to define the sensing window position of the resource reselection before the resource announcement may also be applied to the resource reselection after the resource announcement. For example, assuming that the UE performs the resource reselection process triggered by pre-emption at time point t, the sensing window for resource preliminary selection may be translated to time point t as the sensing window for resource reselection after resource announcement, that is, t-T0~t; or, the sensing window for resource reselection after resource announcement has the same starting position as the sensing window for resource preliminary selection, that is, n-T0~t; or, the starting position of the sensing window is the time point q at which the corresponding SCI for resource declaration is transmitted, that is, q~t.

16. Resource Selection Window for Resource Reselection After Resource Announcement Similar to the resource reselection before the resource announcement, the method used to define the sensing window position of the resource reselection before the resource announcement may also be applied to the resource reselection after the resource announcement. For example, assuming that the UE performs the resource reselection process triggered by pre-emption at time point t, the resource selection window for resource preliminary selection may be translated to time point t as the resource selection window for resource reselection after resource announcement, that is, t+T1~t+T2; or, the resource selection window for resource reselection before resource announcement is translated to time point t as the resource selection window for resource reselection after resource announcement, that is, t+T3~t+T4; or, the starting point and ending point of the resource selection window for resource reselection after the resource announcement may be defined as T5 and T6, that is, t+T5~t+T6, where T5 may have the same value as T1/T3, or T5 may have the same maximum value as T1/T3, T6 may have the same maximum and/or minimum value as T2/T4, but the specific value may be different from T2/T4; or, resource selection window for resource reselection after resource announcement may use all available time until the end of the PDB, that is, t+T5~PDB.

17. Enable/Disable Status of Resource Reselection Function After Resource Announcement Similar to the resource reselection before the resource announcement, the resource reselection function after the resource announcement may also be enabled/disabled. The method used to configure enable/disable status of the resource reselection function before the resource announcement may also be used for the resource reselection function after the resource announcement. For example, the enable/disable status of the resource reselection function after the resource announcement may be configured according to different resource pools, different CBR ranges, different UEs, and different priorities of data.

Optionally, the resource reselection function before the resource announcement and the resource reselection function after the resource announcement share the same enable/disable configuration, that is, both are enabled or disabled at the same time.

Optionally, the resource reselection function before the resource announcement and the resource reselection function after the resource announcement use different enable/disable configurations respectively, that is, they are enabled or disabled separately.

Embodiment Two

Figure 15:
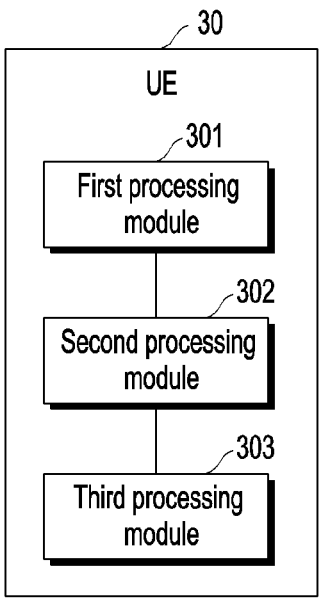
FIG. 15 is a schematic structural diagram of a UE according to an embodiment of the present application.

Based on the same inventive concept of the above embodiment one, an embodiment of the present application further provides a UE, a schematic structural diagram of which is shown in FIG. 15. The UE 30 may include a first processing module 301, a second processing module 302, a third processing module 303 and transceiver.

The first processing module 301 is configured to initiate initial resource selection for temporarily selecting resources for data to be transmitted;

The second processing module 302 is configured to perform a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE;

The third processing module 303 is configured to transmitting PSCCH or PSSCH on the first resource according to a result of the first resource reselection, and announcing other resources except the first resource through the transmitted SCI.

The transceiver may be coupled to the at least one processing module (301, 302, 303).

UE 30 further includes a fourth processing module, which is configured to perform a second resource reselection after the UE announces resources and before transmitting data on the announced resource, and when a second SCI transmitted by other UE is received and the predefined condition for triggering resource reselection is met, wherein the resource reserved by the other UE indicated in the second SCI is at least one of the resources that the UE has announced.

Optionally, the condition for triggering the first resource reselection comprises at least one of the following:

the UE triggers the first resource reselection when Reference Signal Received Power (RSRP), associated with the first SCI, measured by the UE is higher than a preconfigured threshold;

the UE triggers the first resource reselection when priority of the data to be transmitted of the UE is lower than or equal to the priority of the data indicated in the first SCI;

the UE triggers the first resource reselection when the priority of the data to be transmitted of the UE is lower than the priority of the data indicated in the first SCI;

the UE triggers the first resource reselection when the priority of the data to be transmitted of the UE is lower than the priority of the data indicated in the first SCI, and a difference between the priority of the data to be transmitted of the UE and the priority of the data indicated in the first SCI is greater than or equal to a predefined or preconfigured threshold;

the UE triggers the first resource reselection when the resource on which the UE is to collide with the other UE is any one of the resources temporarily selected by the UE;

the UE triggers the first resource reselection when the resource on which the UE is to collide with the other UE is all resources temporarily selected by the UE;

the UE triggers the first resource reselection when the number of resources on which the UE is to collide with the other UE is greater than the predefined or preconfigured threshold;

the UE triggers the first resource reselection when the number of resources temporarily selected by the UE other than resources on which the UE is to collide with the other UE is less than the predefined or preconfigured threshold;

the UE triggers the first resource reselection when the number of resources temporarily selected by the UE other than the resource on which the UE is to collide with the other UE is less than the number of transport blocks to be transmitted, or is insufficient to support one transmission process of data to be transmitted;

the UE triggers the first resource reselection when the resource on which the UE is to collide with the other UE is the first resource temporarily selected by the UE.

Optionally, the RSRP threshold used to trigger the first resource reselection is the same as the RSRP threshold used for resource exclusion in the initial resource selection process.

Optionally, the manner for determining the RSRP threshold used to trigger the first resource reselection comprises any one of the following:

using an initial value of the RSRP threshold used for resource exclusion in the initial resource selection process as the RSRP threshold used to trigger the first resource reselection; or using an adjusted value of the RSRP threshold used for resource exclusion in the initial resource selection process as the RSRP threshold used to trigger the first resource reselection.

Optionally, the RSRP threshold for triggering the first resource reselection and the RSRP threshold for resource exclusion in the initial resource selection process are configured separately.

Optionally, the RSRP threshold for triggering the first resource reselection is configured according to the priority of the data to be transmitted of the UE and the priority of the data indicated in the first SCI.

Optionally, time relationship between the UE triggering the first resource reselection and performing the first resource reselection comprises at least one of the following:

the UE performs the first resource reselection immediately after triggering the first resource reselection, and the time point at which the first resource reselection is triggered is the same as the time point at which the first resource reselection is performed;

the UE does not perform the first resource reselection immediately after triggering the first resource reselection, and until a specific time point the UE performs the first resource reselection, the time point at which the first resource reselection is triggered is different from the time point at which the first resource reselection is performed.

Optionally, the UE performing the first resource reselection immediately after triggering the first resource reselection comprises:

the UE successfully receives the first SCI at a first time point, and when the condition for triggering resource reselection is met, the UE performs the first resource reselection at the first time point; or the UE successfully receives the first SCI at a first time point, and the UE determines whether the first resource reselection is triggered at a predefined time point t0-Tp before the time point t0 of the temporarily selected first resource, when the condition for triggering resource reselection is met, the UE performs the first resource reselection at the time point t0-Tp, wherein the Tp is a predefined or preconfigured value, and the t0-Tp indicates a time point before t0 by an interval of Tp.

Optionally, the UE does not perform the first resource reselection immediately after triggering the first resource reselection, and until a specific time point, the UE performs the first resource reselection, comprising:

the UE successfully receives the first SCI at a first time point, and when the condition for triggering resource reselection is met, the UE triggers the first resource reselection at the first time point, after triggering the first resource reselection, until a predefined time point t0-Tp before the time point t0 of the first resource temporarily selected by the UE, the UE performs the first resource reselection, where Tp is a predefined or preconfigured value, the t0-Tp indicates a time point before t0 by an interval of Tp; or the UE successfully receives the first SCI at the first time point, and when the condition for triggering resource reselection is met, the UE triggers the first resource reselection at the first time point, and after triggering the first resource reselection, until the time point before the first available resource by a predefined interval Tp, the UE performs the first resource reselection, where Tp is a predefined or preconfigured value.

Optionally, the Tp comprises at least a preparation time for transmitting a PSCCH/PSSCH, and/or a processing time for performing the first resource reselection process.

Optionally, the number of times that the UE performs the first resource reselection should not exceed a predefined or preconfigured maximum value.

Optionally, when the number of times that the UE performs the first resource reselection exceeds the maximum value and a collision will occur between the resources selected by the UE and resources announced by other UEs, and the conditions for triggering the resource reselection are met, the transmit power of the PSCCH and/or the PSSCH transmitted on the resource to be collided is adjusted by the UE.

Optionally, the adjustment amount of the transmit power of the PSCCH and/or the transmit power of the PSSCH is related to at least one of the following:

RSRP of the other UE measured by the UE;

priority of the data to be transmitted of the UE; and priority of the data of the other UE.

Optionally, adjusting the transmit power of the PSCCH and/or the transmit power of the PSSCH comprises at least one of the following:

when the priority of the data to be transmitted of the UE is higher than the priority of the data of the other UE, and/or the RSRP of the other UE measured by the UE is lower than a preconfigured threshold, the transmit power of the PSCCH and/or the transmit power of the PSSCH transmitted by the UE on the resource to be collided is adjusted to be higher;

when the priority of the data to be transmitted of the UE is lower than the priority of the data of the other UE, and/or the RSRP of the other UE measured by the UE is higher than the preconfigured threshold, the transmit power of the PSCCH and/or the transmit power of the PSSCH transmitted by the UE on the resource to be collided is adjusted to be lower.

Optionally, the manner of defining a sensing window for the first resource reselection comprises at least one of the following:

the sensing window for the first resource reselection is a translation of a sensing window for a resource preliminary selection, and the resource preliminary selection is the initial resource selection;

the sensing window for the first resource reselection includes the sensing window for the resource preliminary selection, the time after a time point n and before a time point m, where the time point n is a time point at which the resource preliminary selection is performed, and the time point m is a time point at which the first resource reselection is performed;

the sensing window for the resource reselection includes the time after the time point n and before the time point m.

Optionally, a manner of defining a resource selection window for the first resource reselection comprises at least one of the following:

using a same criteria to determine the resource selection window for the first resource reselection and the resource selection window for a resource preliminary selection, and there is no correlation between the actual lengths of the two resource selection windows, wherein the resource preliminary selection is the initial resource selection;

the resource selection window for the first resource reselection is a translation of the resource selection window for resource preliminary selection;

the resource selection window for the first resource reselection is the remaining available time in the resource selection window for the resource preliminary selection;

the resource selection window for the first resource reselection includes all of available time until Packet Delay Budget (PDB).

Optionally, an enable or disable status of the first resource reselection function is configured by at least one of the following:

configuring the enable or disable status of the first resource reselection function for each resource pool;

configuring the enable or disable status of the first resource reselection function for each UE;

configuring the enable or disable status of the first resource reselection function for a Channel Busy Ratio (CBR) on a resource pool; and configuring the enable or disable status of the first resource reselection function for the priority of the data.

Optionally, configuring the enable or disable status of the first resource reselection function before resource announcement for a CBR on a resource pool, comprising:

for the same resource pool, when the CBR is greater than a first threshold, the first resource reselection function is set to be enabled; when the CBR is less than a second threshold, the first resource reselection function is set to be disabled.

Optionally, configuring the enable or disable status of the first resource reselection function before the resource announcement for each priority or a range of priority of data, comprising:

for the same UE, when the priority of data to be transmitted is greater than a first priority, the first resource reselection function is set to be enabled; when the priority of data to be transmitted is lower than a second priority, the first resource reselection function is set to be disabled.

Optionally, the condition for triggering the second resource reselection comprises at least one of the following:

the UE triggers the second resource reselection when RSRP, associated with the second SCI, measured by the UE is higher than a preconfigured threshold;

the UE triggers the second resource reselection when the interval between the time when the UE successfully receives the second SCI and the PDB of the data to be transmitted is greater than a predefined or preconfigured threshold;

the UE triggers the second resource reselection when the resource that the UE will collide with other UE is used for the first transmission of a transport block of the UE.

Optionally, a manner of determining a time point at which performing second resource reselection includes any of the following:

the UE successfully receives the second SCI at the second time point, and when the condition for triggering the resource reselection is met, the UE performs the second resource reselection at the second time point;

the UE successfully receives the second SCI at the second time point, and when the condition for triggering the resource reselection is met, the UE performs the second resource reselection at a time point by a predefined interval before the time point at which the resource to be collided is located.

The technical solutions provided in the embodiments of the present application have at least the following beneficial effects:

In the embodiment of the present application, initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

For the content not described in detail in the UE provided in the embodiment of the present application, reference may be made to the foregoing resource allocation method. The beneficial effects that the UE provided in the embodiment of the present application may achieve are the same as the foregoing method for resource allocation, and are not described herein again.

Embodiment Three

Figure 16:
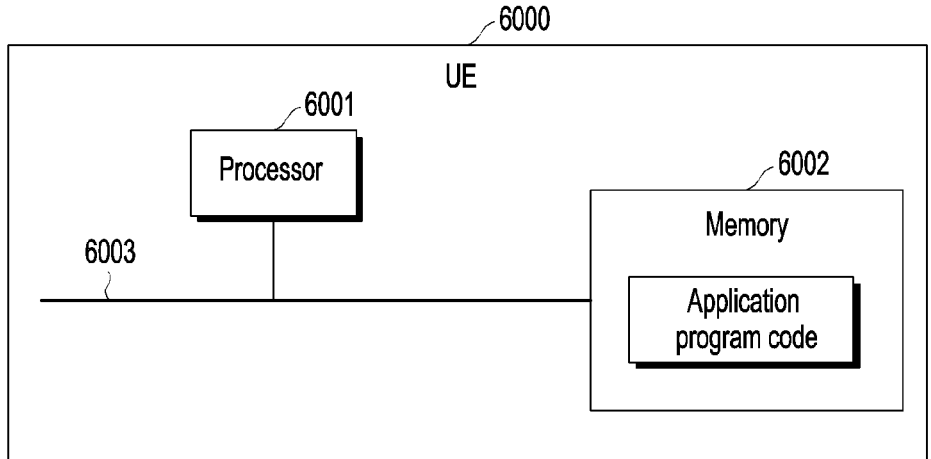
FIG. 16 is a schematic structural diagram of a UE according to an embodiment of the present application.

Based on the same inventive concept, an embodiment of the present application further provides a UE, a schematic structural diagram of which is shown in FIG. 16. The UE 6000 may include at least one processor 6001, a memory 6002, and a bus 6003. At least one processor 6001 is electrically connected with the memory 6002; the memory 6002 is configured to store at least one computer-executable instruction, and the at least one processor 6001 is configured to execute the at least one computer-executable instruction, so as to execute any one of the embodiments in the embodiment one of the present application or steps of any method for resource allocation provided by any optional embodiments.

Further, the at least one processor 6001 may be a Field-Programmable Gate Array (FPGA) or other devices with logic processing capabilities, such as a Microcontroller Unit (MCU), and a Central Process Unit (CPU).

The embodiments of the present application have at least the following beneficial effects:

In the embodiment of the present application, initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting Physical Sidelink Control Channel (PSCCH) or Physical Sidelink Shared Channel (PSSCH) on first resource according to a result of the first resource reselection, and announcing other resources except the first resource through the transmitted SCI. In this way, the UE autonomous resource allocation of the NR V2X system in Mode 2 is achieved.

Those skilled in the art can understand that computer program instructions can be used to implement each block in these structural diagrams and/or block diagrams and/or flow diagrams and a combination of these structural diagrams and/or block diagrams and/or flow diagrams. Those skilled in the art may understand that these computer program instructions may be provided to a general purpose computer, a dedicated computer, or a processor specified by other programmable data processing methods to implement, so that a computer or a processor specified by other programmable data processing method is used to execute a scheme specified in a block or blocks of the structural diagram and/or block diagram and/or flow diagram disclosed in the present application.

Those skilled in the art can understand that the steps, measures, solutions in various operations, methods, flows that have been discussed in this application can be alternated, modified, combined, or deleted. Further, the other steps, measures, solutions in various operations, methods, flows that have been discussed in this application can also be alternated, modified, rearranged, decomposed, combined, or deleted. Further, the steps, measures, solutions in various operations, methods, flows, in prior art, disclosed in this application can also be alternated, modified, rearranged, decomposed, combined, or deleted.

The above description is only part of the implementation of the present application. It should be noted that, for those of ordinary skill in the art, without departing from the principles of the present application, several improvements and retouches can be made, which are also within the protection scope of this application.

The invention claimed is:

1. A method performed by a user equipment (UE) in a wireless communication, the method comprising:
identifying resources selected to transmit data;
performing a resource reselection comprises:
identifying resources for pre-emption, wherein at least one resource of the resources for the pre-emption is associated with a resource determined based on a sidelink control information (SCI) received from other UE,
identifying whether reference signal received power (RSRP) for the SCI is higher than a threshold, wherein the RSRP is measured by the UE,
identifying configuration information indicating whether the pre-emption is enabled or disabled, identifying a first priority value of transmission associated with the UE and a second priority value indicated by the SCI, and
replacing the at least one resource of the resources for the pre-emption, wherein the RSRP is higher than the threshold, the configuration information indicates that the pre-emption is enabled, and the first priority value is higher than the second priority value; and
transmitting a physical sidelink control channel (PSCCH) or a physical sidelink shared channel (PSSCH) based on the resource reselection.

2. The method of claim 1, wherein identifying the resources for the pre-emption is performed at a predefined value before time point for the resources selected to transmit the data, and
wherein the predefined value is determined based on sub-carrier spacing.

3. The method of claim 1, wherein condition for triggering the pre-emption includes at least one of:
triggering the pre-emption when a measurement result of RSRP associated with a first SCI is higher than a preconfigured threshold; or
triggering the pre-emption when a priority of the data of the UE is lower than a priority of data indicated in the first SCI and a difference between the priority of the data of the UE and the priority of the data indicated in the first SCI is greater than the preconfigured threshold.

4. The method of claim 3, wherein an RSRP threshold used to trigger the pre-emption is identified as a same value of an RSRP threshold used for a resource exclusion in an initial resource selection, and
wherein the RSRP threshold used to trigger the pre-emption is determined based on one of:
using an initial value of the RSRP threshold used for the resource exclusion in the initial resource selection as the RSRP threshold used to trigger the pre-emption; or
using an adjusted value of the RSRP threshold used for the resource exclusion in the initial resource selection as the RSRP threshold used to trigger the pre-emption.

5. The method of claim 1, for identifying a time relationship between triggering the pre-emption and performing the pre-emption, further comprising at least one of:
performing the pre-emption immediately after triggering the pre-emption when a time point at which the pre-emption is triggered is identified as a same value of the time point at which the pre-emption is performed; or
not performing the pre-emption immediately after triggering the pre-emption and performing the pre-emption until meeting with a specific time point when the time point at which the pre-emption is triggered is identified as a different value of the time point at which the pre-emption is performed.

6. The method of claim 5, wherein performing the pre-emption immediately after triggering the pre-emption comprises:
successfully receiving a first sidelink control information (SCI) at a first time point and performing the pre-emption at the first time point when a predefined condition for triggering the resource reselection is met; or
successfully receiving the first SCI at the first time point and determining whether the pre-emption is triggered at a predefined time point Tp before a time point to at which first resource temporarily selected by the UE is located, and when the predefined condition for triggering the resource reselection is met, performing the pre-emption at a time point t0-Tp, the time point Tp being a predefined or preconfigured value, and the time point t0-Tp indicating a time point before the time point to by an interval of the time point Tp, and wherein, when the UE does not perform the pre-emption immediately after triggering the pre-emption and the UE performs the pre-emption until a specific time point, further comprising:

successfully receiving the first SCI at a first time point and triggering the pre-emption at the first time point when the predefined condition for triggering the resource reselection is met, and after triggering the pre-emption, performing the pre-emption until the time point t0-Tp is located before the time point to at which the first resource temporarily selected by the UE is located, the time point Tp being a predefined or preconfigured value and the time point t0-Tp indicating a time point before the time point to by an interval of the time point Tp; or successfully receiving the first SCI at the first time point and triggering the pre-emption at the first time point when the predefined condition for triggering the resource reselection is met, and after triggering the pre-emption performing the pre-emption until the time point before a first available resource identified by a predefined interval, the time point Tp is a predefined or preconfigured value.

7. The method of claim 6, wherein the time point Tp comprises at least one of a preparation time for transmitting the data on at least one of the PSCCH or the PSSCH or a processing time for performing the pre-emption.

8. The method of claim 1, wherein a number of times that the UE performs the pre-emption is less than or equal to a predefined or preconfigured maximum value.

9. The method of claim 8, further comprising:

when the number of times that the UE performs the pre-emption exceeds the predefined or preconfigured maximum value and a collision occurs between the resources selected by the UE and resources announced by other UEs, and a predefined condition for triggering the resource reselection is met, adjusting transmit power of at least one of the PSCCH or the PSSCH transmitted by the UE on a resource, wherein an amount of the adjusted transmit power of the at least one of the PSCCH or the PSSCH is identified based on at least one of:

RSRP of the other UEs measured by the UE;

a priority of the data to be transmitted; or the priority of the data of the other UEs, and wherein adjusting the transmit power of at least one of the PSCCH or the PSSCH comprises at least one of:

when the priority of the data of the UE is higher than the priority of the data of the other UEs or the RSRP of the other UEs measured by the UE is lower than a preconfigured threshold, adjusting the transmit power of the at least one of the PSCCH or the PSSCH transmitted by the UE on the resource to be higher than a transmit power of the other UEs; and when the priority of the data of the UE is lower than the priority of the data of the other UEs or the RSRP of the other UEs measured by the UE is higher than the preconfigured threshold, adjusting the transmit power of the at least one of the PSCCH or the PSSCH transmitted by the UE on the resource to be lower than a transmit power of the other UEs.

10. The method of claim 9, wherein adjusting the transmit power of the at least one of the PSCCH or the PSSCH comprises at least one of:

when the priority of the data of the UE is higher than the priority of the data of the other UEs or the RSRP of the other UEs measured by the UE is lower than a preconfigured threshold, adjusting the transmit power of the at least one of the PSCCH or the PSSCH transmitted by the UE on the resource to be higher than a transmit power of the other UEs; and when the priority of the data of the UE is lower than the priority of the data of the other UEs or the RSRP of the other UEs measured by the UE is higher than the preconfigured threshold, adjusting the transmit power of the at least one of the PSCCH or the PSSCH transmitted by the UE on a resource to be lower than a transmit power of the other UEs.

11. The method of claim 1, wherein a sensing window for the pre-emption is identified as at least one of:

a sensing window for a resource preliminary selection comprising an initial resource selection;

a sensing window for the resource preliminary selection and a time after a time point n and before a time point m, the time point n being a time point at which the resource preliminary selection is performed and the time point m being a time point at which the pre-emption is performed; or a sensing window for the resource reselection including the time after the time point n and before the time point m.

12. The method of claim 1, wherein a resource selection window for the pre-emption is identified as at least one of:

using a same criteria to determine the resource selection window for the pre-emption and the resource selection window for a resource preliminary selection, the resource preliminary selection being an initial resource selection;

the resource selection window for the pre-emption, the resource selection window being a translation of the resource selection window for a resource preliminary selection;

the resource selection window for the pre-emption, the resource selection window being a remaining available time within the resource selection window for the resource preliminary selection; and the resource selection window for the pre-emption, the resource selection window including entire available time until packet delay budget (PDB).

13. The method of claim 1, wherein an enable or disable status of a first resource reselection function is configured by at least one of:

configuring the enable or disable status of the first resource reselection function for each UE;

configuring the enable or disable status of the first resource reselection function for a channel busy ratio (CBR) on a resource pool; or configuring the enable or disable status of the first resource reselection function for a priority of the data, wherein configuring the enable or disable status of the first resource reselection function before resource announcement for a CBR on a resource pool comprises, for a same resource pool:

when the CBR is greater than a first threshold, enabling the first resource reselection function; and when the CBR is less than a second threshold, disabling the first resource reselection function, and wherein configuring the enable or disable status of the first resource reselection function before the resource announcement for each priority or a range of the priority of the data comprising, for a same UE:

when the priority of the data of the UE is greater than a first priority, enabling the first resource reselection function; and when the priority of the data of the UE is lower than a second priority, disabling the first resource reselection function.

14. The method of claim 1, wherein an enable or disable status of a first resource reselection function is configured for each resource pool.

15. The method of claim 1, wherein a predefined condition for triggering the pre-emption comprises at least one of:

triggering the pre-emption when a priority of the data of the UE is lower than or equal to a priority of data indicated in a first sidelink control information (SCI);

triggering the pre-emption when the priority of the data of the UE is lower than the priority of the data indicated in the first SCI;

triggering the pre-emption when a resource on which the UE is to collide with other UEs is one of resources temporarily selected by the UE;

triggering the pre-emption when the resource on which the UE is to collide with the other UEs is entire resources temporarily selected by the UE;

triggering the pre-emption when a number of resources on which the UE is to collide with the other UEs is greater than a predefined or preconfigured threshold;

triggering the pre-emption when a number of resources temporarily selected by the UE, other than the resource on which the UE is to collide with the other UEs, is less than the predefined or preconfigured threshold;

triggering the pre-emption when the number of resources temporarily selected by the UE, other than the resource on which the UE is to collide with the other UEs, is less than a number of transport blocks to be transmitted or is insufficient to support one transmission of the data; and triggering the pre-emption when the resource on which the UE is to collide with the other UEs is a first resource temporarily selected by the UE.

16. A user equipment (UE) in a wireless communication, the UE comprising:

a transceiver; and at least one processor coupled to the transceiver, the at least one processor configured to:

identify resources selected to transmit data, perform a resource reselection, and transmit a physical sidelink control channel (PSCCH) or a physical sidelink shared channel (PSSCH) based on the resource reselection, wherein performing the resource reselection comprises:

identifying resources for pre-emption, wherein at least one resource of the resources for the pre-emption is associated with a resource determined based on a sidelink control information (SCI) received from other UE, identifying whether reference signal received power (RSRP) for the SCI is higher than a threshold, wherein the RSRP is measured by the UE, identifying configuration information indicating whether the pre-emption is enabled or disabled, identifying a first priority value of transmission associated with the UE and a second priority value indicated by the SCI, and replacing the at least one resource of the resources for the pre-emption, wherein the RSRP is higher than the threshold, the configuration information indicates that the pre-emption is enabled, and the first priority value is higher than the second priority value.

17. The UE of claim 16, wherein identifying the resources for the pre-emption is performed at a predefined value before time point for the resources selected to transmit the data, and wherein the predefined value is defined based on a sub-carrier spacing.

18. The UE of claim 16, wherein a predefined condition for triggering the pre-emption is identified based on at least one of:

triggering the pre-emption when a measurement result of reference signal received power (RSRP) associated with a first sidelink control information (SCI) is higher than a predefined or preconfigured threshold; or triggering the pre-emption when a priority of the data of the UE is lower than a priority of data indicated in the first SCI and a difference between the priority of the data of the UE and the priority of the data indicated in the first SCI is greater than the predefined or preconfigured threshold.

19. The UE of claim 18, wherein an RSRP threshold used to trigger the pre-emption is identified as a same value of an RSRP threshold used for a resource exclusion in an initial resource selection, and wherein the RSRP threshold used to trigger the pre-emption is determined based on one of:

using an initial value of the RSRP threshold used for the resource exclusion in the initial resource selection as the RSRP threshold used to trigger the pre-emption; or using an adjusted value of the RSRP threshold used for the resource exclusion in the initial resource selection as the RSRP threshold used to trigger the pre-emption.

20. The UE of claim 16, wherein an enable or disable status of a first resource reselection function is configured for each resource pool.

* * * * *